US008089570B2

(12) United States Patent
Kim et al.

(10) Patent No.: US 8,089,570 B2
(45) Date of Patent: Jan. 3, 2012

(54) LIQUID CRYSTAL DISPLAY

(75) Inventors: Sung-Woon Kim, Suwon-si (KR); Hee-Seop Kim, Hwaseong-si (KR); Hyang-Yul Kim, Hwaseong-si (KR); Joo-Nyung Jang, Seongnam-si (KR); Soon-Joon Rho, Suwon-si (KR); Hwa-Sung Woo, Asan-si (KR); Cheol Shin, Hwaseong-si (KR); Dong-Chul Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 149 days.

(21) Appl. No.: 12/749,064

(22) Filed: Mar. 29, 2010

(65) Prior Publication Data

US 2011/0037913 A1 Feb. 17, 2011

(30) Foreign Application Priority Data

Aug. 13, 2009 (KR) ........................ 10-2009-0074889

(51) Int. Cl.
*G02F 1/141* (2006.01)
*G02F 1/136* (2006.01)

(52) U.S. Cl. ............................................ 349/37; 345/92

(58) Field of Classification Search .................... 349/37, 349/38, 41; 345/92, 98
See application file for complete search history.

(56) References Cited

U.S. PATENT DOCUMENTS

| | | | | |
|---|---|---|---|---|
| 7,859,502 | B2 * | 12/2010 | Son et al. | 345/92 |
| 7,961,265 | B2 * | 6/2011 | Lu et al. | 349/48 |
| 2006/0158408 | A1 * | 7/2006 | Hirose | 345/87 |
| 2009/0207119 | A1 * | 8/2009 | Han et al. | 345/98 |
| 2009/0310047 | A1 * | 12/2009 | Shin et al. | 349/37 |
| 2010/0238369 | A1 * | 9/2010 | Kim | 349/48 |
| 2010/0302471 | A1 * | 12/2010 | Kim et al. | 349/37 |
| 2011/0221988 | A1 * | 9/2011 | Cho et al. | 349/41 |

* cited by examiner

*Primary Examiner* — Akm Ullah
(74) *Attorney, Agent, or Firm* — H.C. Park & Associates, PLC

(57) ABSTRACT

A liquid crystal display according to an exemplary embodiment of the present invention includes a first and second substrate facing each other, a liquid crystal layer interposed between the substrates, a plurality of gate lines disposed on the first substrate, configured to transmit a gate signal, at least one data line disposed on the first substrate, configured to transmit a data signal, a plurality of power supplying lines disposed on the first substrate, a plurality of switching elements variously connected to the gate lines, data lines, and power supplying lines, a plurality of pixel electrodes connected to the switching elements, wherein corresponding pixel electrodes are separated from each other.

19 Claims, 12 Drawing Sheets

LIQUID CRYSTAL DISPLAY

CROSS REFERENCE TO RELATED APPLICATION

This application claims priority from and the benefit of Korean Patent Application No. 10-2009-0074889, filed on Aug. 13, 2009, which is hereby incorporated by reference for all purposes as if fully set forth herein.

BACKGROUND OF THE INVENTION

1. Field of the Invention

Exemplary embodiments of the present invention relate to a liquid crystal display.

2. Discussion of the Background

A liquid crystal display (LCD) is one of the most widely used flat panel displays. The LCD includes two display panels provided with electric field generating electrodes, such as pixel electrodes and a common electrode, and a liquid crystal layer interposed between the two is display panels. In the LCD, voltages are applied to the electric field causing electrodes to generate an electric field in the liquid crystal layer. Due to the generated electric field, liquid crystal molecules of the liquid crystal layer are aligned and polarization of incident light is controlled, thereby displaying images.

The LCD also includes switching elements connected to the respective pixel electrodes, and a plurality of signal lines such as gate lines and data lines for controlling the switching elements and applying voltages to the pixel electrodes.

The liquid crystal display may receive an input image signal from an external graphics controller, the input image signal may contain luminance information of each pixel, and the luminance may have grays of a given quantity. Each pixel is applied with the data voltage corresponding to the desired luminance information. The data voltage applied to the pixel appears as a pixel voltage according to a difference with reference to the common voltage, and each pixel displays a luminance representing a gray of the image signal according to the pixel voltage. Here, the range of the pixel voltage that is applicable to the liquid crystal display is determined according to a driver.

The driver of the liquid crystal display may be mounted on the display panel in a form of a plurality of integrated circuit (IC) chips, or may be installed on a flexible circuit film and attached to the display panel. The IC chip represents a large proportion of the manufacturing cost of the liquid crystal display. Accordingly, the cost of the driver of the liquid crystal display is increased as the number of data lines applying the data voltage is increased.

To improve the display quality of the liquid crystal display, it is beneficial to develop a liquid crystal display having a high contrast ratio, excellent viewing angle, and fast response speed.

The above information disclosed in this Background of the Invention section is only for enhancement of understanding of the background of the invention and therefore it may contain information not within the prior art.

SUMMARY OF THE INVENTION

Exemplary embodiments of the present invention provide a high contrast ratio and a wide viewing angle of a liquid crystal display, and a fast response speed of liquid crystal molecules.

Exemplary embodiments of the present invention also provide a reduced cost of the driver of the liquid crystal display by decreasing the number of data lines.

Additional features of the invention will be set forth in the description which follows, and in part will be apparent from the description, or may be learned by practice of the invention.

An exemplary embodiment of the present invention discloses a liquid crystal display including a first substrate, a second substrate facing the first substrate, a liquid crystal layer interposed between the first substrate and the second substrate, the liquid crystal layer including liquid crystal molecules, a first gate line disposed on the first substrate, the first gate line being configured to transmit a first gate signal, a second gate line disposed on the first substrate, the second gate line being configured to transmit a second gate signal, a first data line disposed on the first substrate, the first data line being configured to transmit a first data signal, a first power supplying line disposed on the first substrate, a second power supplying line disposed on the first substrate, a first switching element connected to the first gate line and the first data line, a second switching element connected to the first gate line and the first power supplying line, a third switching element connected to the second gate line and the first data line, a fourth switching element connected to the second gate line and the second power supplying line, a first pixel electrode connected to the first switching element and the third switching element, and a second pixel electrode connected to the second switching element and the fourth switching element, the second pixel electrode being separated from the first pixel electrode, wherein the at least one first power supplying line is applied with a first voltage and the at least one second power supplying line is applied with a second voltage.

An exemplary embodiment of the present invention also discloses a liquid crystal display including a first substrate, a second substrate facing the first substrate, a liquid crystal layer interposed between the first substrate and the second substrate, the liquid crystal layer including liquid crystal molecules, a first gate line disposed on the first substrate, the first gate line being configured to transmit a first gate signal, a second gate line disposed on the first substrate, the second gate line being configured to transmit a second gate signal, a first data line disposed on the first substrate, a second data line disposed on the first substrate, a first power supplying line disposed on the first substrate, a second power supplying line disposed on the first substrate, a first switching element connected to the first gate line and the first data line, a second switching element connected to the first gate line and the first power supplying line, a third switching element connected to the second gate line and the second power supplying line, a fourth switching element connected to the second gate line and the second data line, a first pixel electrode connected to the first switching element and the third switching element, and a second pixel electrode connected to the second switching element and the fourth switching element, the second pixel electrode being separated from the first pixel electrode, wherein the at least one first power supplying line is applied with a first voltage and the at least one second power supplying is line is applied with a second voltage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
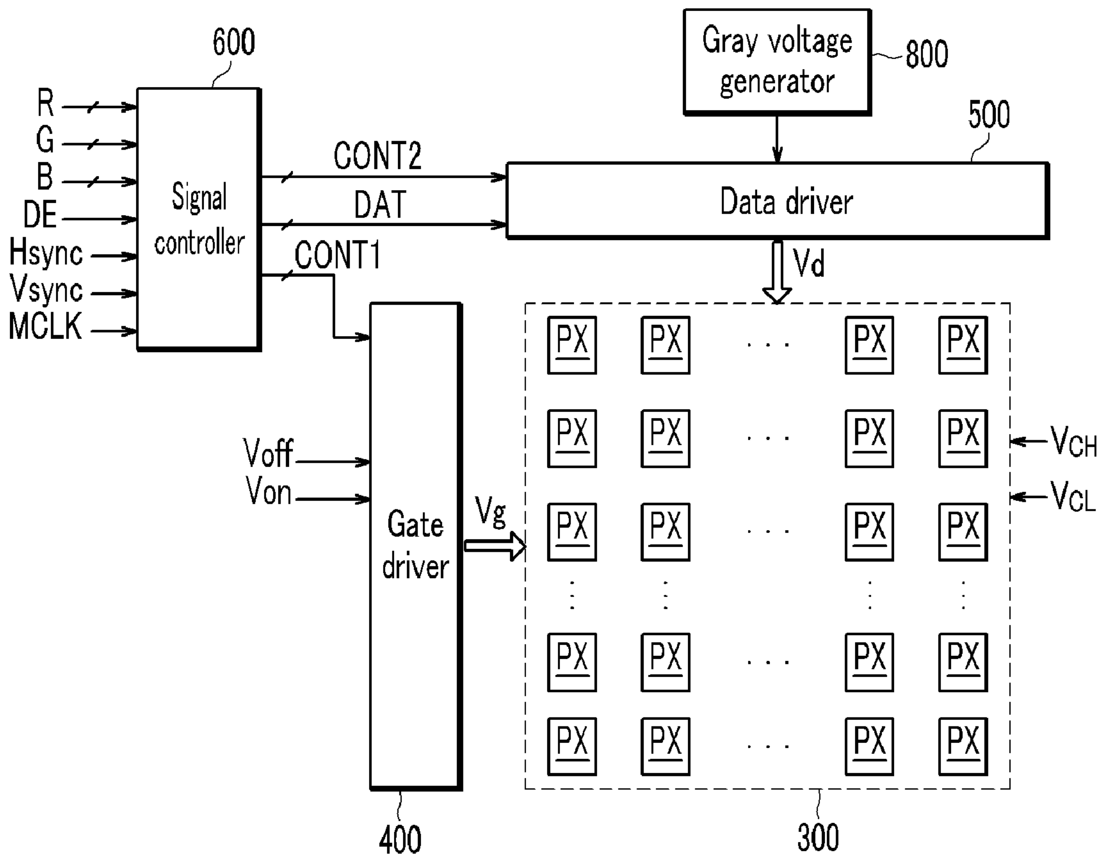
FIG. 1 is a block diagram of a liquid crystal display according to an exemplary embodiment of the present invention.

The present invention will be described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Hereinafter, a liquid crystal display according to an exemplary embodiment of the present invention will be described in detail with reference to the accompanying drawings.

Figure 2:
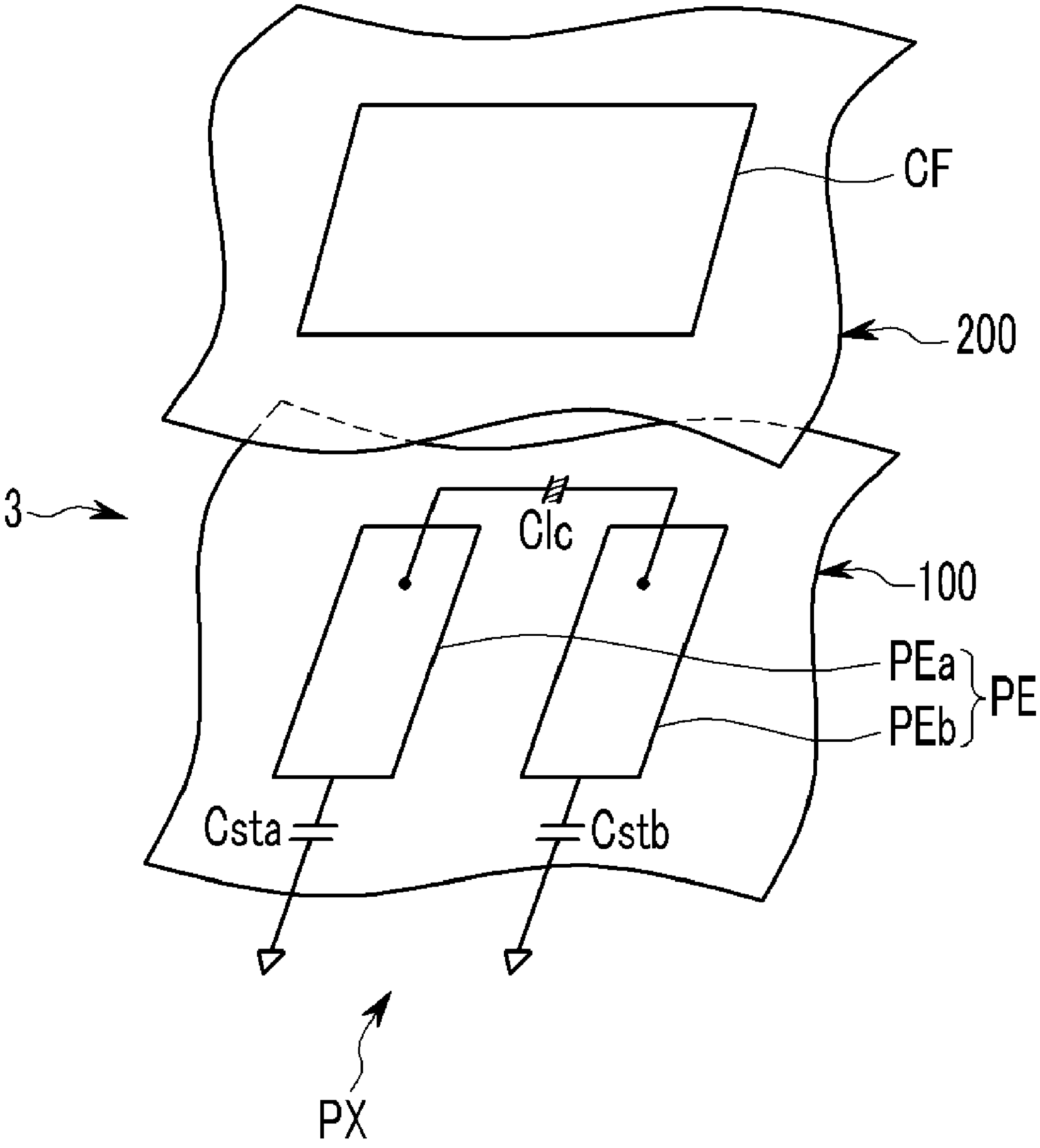
FIG. 2 is an equivalent circuit diagram showing a structure of a liquid crystal display and one pixel according to an exemplary embodiment of the present invention.

FIG. 1 is a block diagram of a liquid crystal display according to an exemplary embodiment of the present invention, and FIG. 2 is an equivalent circuit diagram showing a structure of a liquid crystal display and one pixel according to an exemplary embodiment of the present invention.

Referring to FIG. 1, a liquid crystal display according to an exemplary embodiment of the present invention includes a liquid crystal panel assembly 300, a gate driver 400, a data driver 500, a gray voltage generator 800, and a signal controller 600.

Referring to FIG. 2, the liquid crystal panel assembly 300 includes lower panel 100 and upper panel 200 facing each other, and a liquid crystal layer 3 therebetween.

The liquid crystal capacitor Clc adopts the first pixel electrode PEa and the second pixel electrode PEb of the lower panel 100 as two terminals, and the liquid crystal layer 3 between the first pixel electrode PEa and the second pixel electrode PEb serves as a dielectric material. The first pixel electrode PEa is connected to a first switching element (not shown), and the second pixel electrode PEb is connected to a second switching element (not shown). The first switching element and the second switching element are respectively connected to the corresponding gate line (not shown) and data line (not shown).

The liquid crystal layer 3 has dielectric anisotropy, and liquid crystal molecules of the liquid crystal layer 3 may be arranged such that their long axes are aligned perpendicular to surfaces of the two panels 100 and 200 when an electric field is not applied.

The first pixel electrode PEa and the second pixel electrode PEb may be formed at different layers from each other, or at the same layer. First and second storage capacitors (not shown) serving as assistants of the liquid crystal capacitor Clc may be formed by overlapping separate electrodes (not shown) provided on the lower panel 100 and the first pixel electrode PEa and the second pixel electrode PEb via an insulator while being interposed therebetween.

In order to realize color display, each pixel PX uniquely displays one of primary colors (spatial division), or each pixel PX temporally and alternately displays primary colors (temporal division). Then, the primary colors are spatially or temporally synthesized, and thus a desired color is recognized. An example of the primary colors may be three primary colors of red, green, and blue. One example of the spatial division is represented in FIG. 2, where each pixel PX is provided with a color filter (CF) indicating one of the primary colors on the region of the upper panel 200 corresponding to the first pixel electrode PEa and the second pixel electrode PEb. Unlike FIG. 2, the color filter CF may be alternately formed on or below the first pixel electrode PEa and the second pixel electrode PEb of the lower panel 100.

At least one polarizer (not shown) for providing light polarization is provided in the liquid crystal panel assembly 300.

Next, an operation of a liquid crystal display according to an exemplary embodiment of the present invention will be described with reference to FIG. 3 as well as FIG. 1 and FIG. 2.

Figure 3:
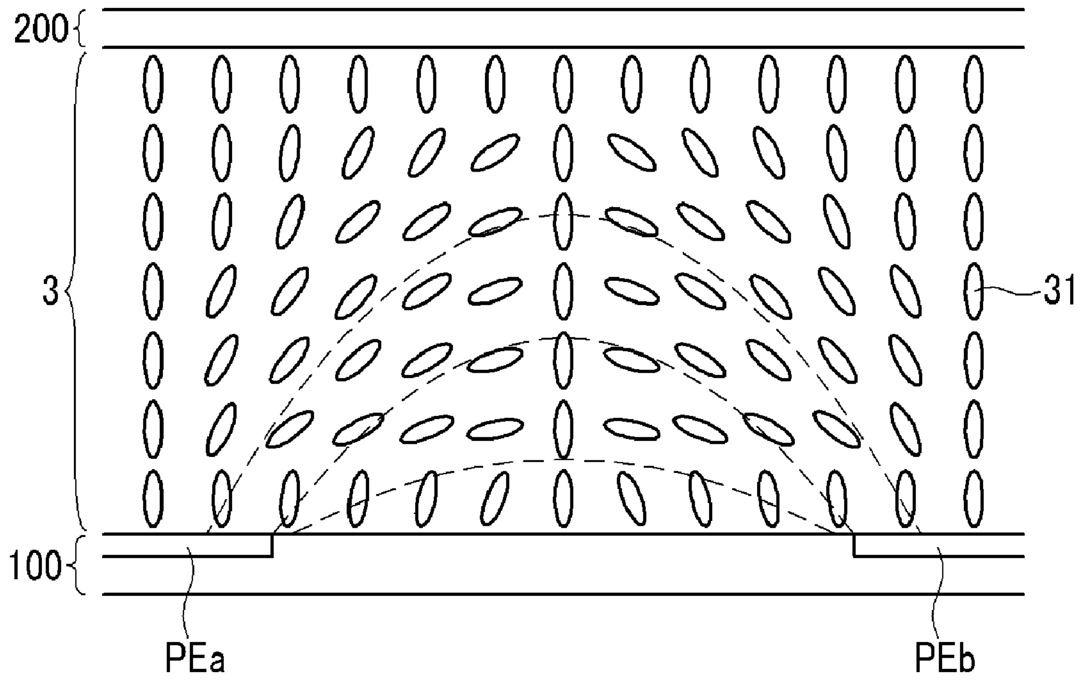
FIG. 3 is a schematic cross-sectional view of a liquid crystal display according to an exemplary embodiment of the present invention.

FIG. 3 is a schematic cross-sectional view of a liquid crystal display according to an exemplary embodiment of the present invention.

Referring to FIG. 1, FIG. 2, and FIG. 3, if a data line or a power supplying line connected to a pixel is applied with the data voltage $V_{CH}$, $V_{CL}$, the data voltage is applied to the corresponding pixel PX through the turned-on first switching element and second switching element by the gate signal. That is, the first pixel electrode PEa is applied with the first data voltage or the first voltage through the first switching element, and the second pixel electrode PEb is applied with the second data voltage or the second voltage through the second switching element. Here, the data voltage, the first voltage, or the second voltage applied to the first pixel electrode PEa and the second pixel electrode PEb are voltages corresponding to the luminance to be displayed by the pixel PX, and may have opposite polarities with respect to the reference voltage Vref.

The difference between the data voltages or the voltages applied to the first pixel electrode PEa and the second pixel electrode PEb and having opposite polarities is expressed as a charged voltage of the liquid crystal capacitors Clc, i.e., a pixel voltage. If a potential difference is generated between two terminals of the liquid crystal capacitor Clc, as shown in FIG. 3, an electric field parallel to the surface of the display panel 100 and 200 is formed on the liquid crystal layer 3 between the first pixel electrode PEa and the second pixel electrode PEb. When liquid crystal molecules 31 have positive dielectric anisotropy, the liquid crystal molecules 31 are arranged such that the long axes thereof are aligned parallel to the direction of the electric field, and the degree of inclination is changed according to the magnitude of the pixel voltage. This liquid crystal layer 3 is referred to as an electrically-induced optical compensation (EOC) mode liquid crystal layer. Also, the degree of the polarization of light passing through the liquid crystal layer 3 is changed according to the inclination degree of the liquid crystal molecules 31. The change of the polarization appears as a change in transmittance of the light by the polarizer, and accordingly, the pixel PX displays the desired luminance.

As described above, one pixel PX is applied with the first data voltage and the is second data voltage or the first voltage and the second voltage having different polarities with respect to the reference voltage Vref such that the driving voltage may be increased and the response speed of the liquid crystal molecule may be increased, and the transmittance of the liquid crystal display may therefore be increased. Also, the polarities of first data voltage and the second data voltage or the first voltage and the second voltage applied to one pixel PX are opposite to each other such that degradation of the display quality due to flicker may be prevented under driving types such as column inversion or row inversion, like it is under dot inversion.

Also, when the first switching element and the second switching element are turned off in one pixel PX, the voltages applied to the first pixel electrode PEa and the second pixel electrode PEb are decreased by a kickback voltage such that the charging voltage of the pixel PX is only slightly changed. Accordingly, the display characteristics of the liquid crystal display may be improved.

Figure 4:
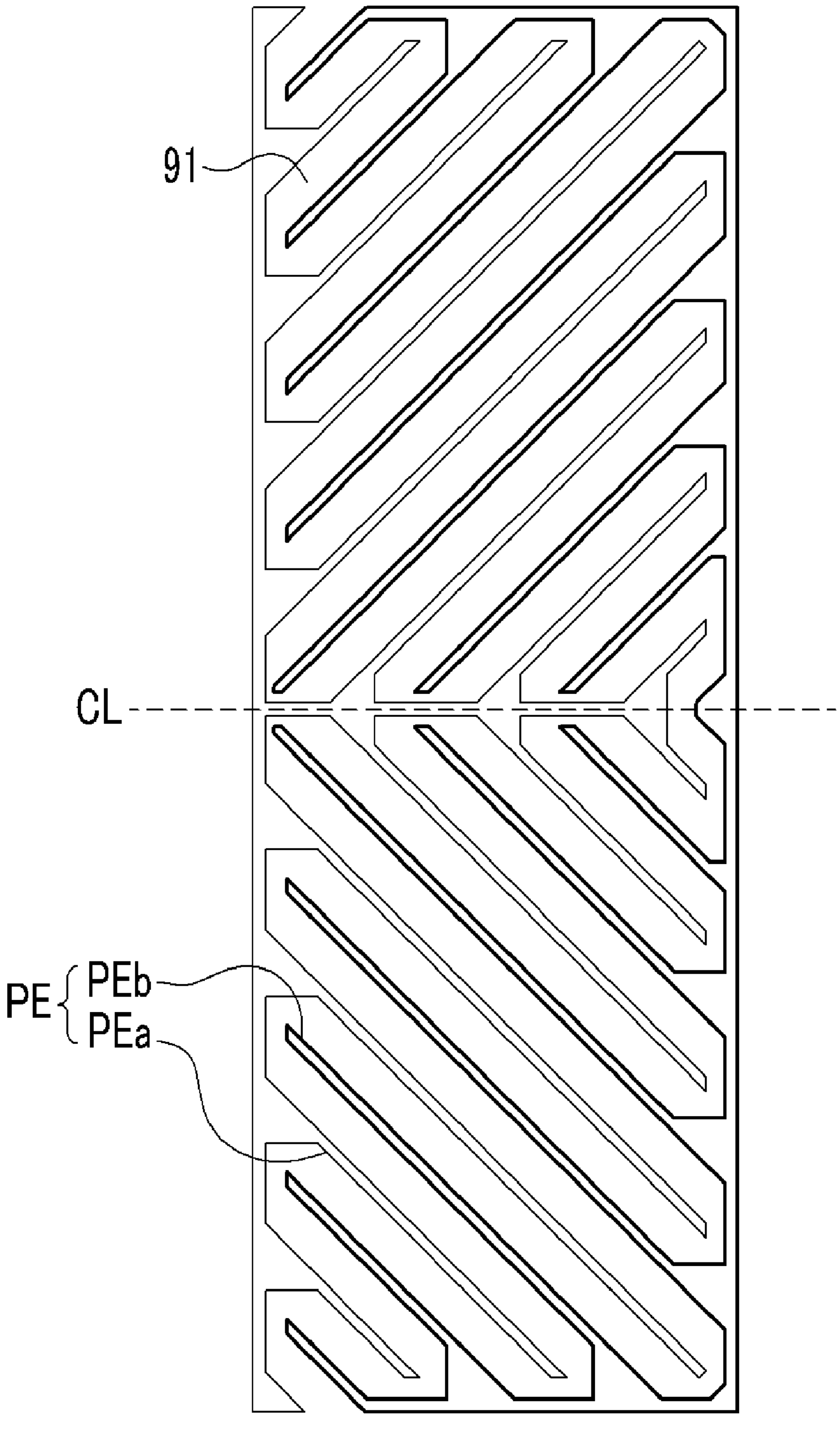
FIG. 4 is a layout view of a pixel in a liquid crystal display according to an exemplary embodiment of the present invention.

Next, the shape of the first pixel electrode PEa and the second pixel electrode PEb of one pixel PX of the liquid crystal panel assembly 300 according to an exemplary embodiment of the present invention will be described with reference to FIG. 4. FIG. 4 is a layout view of a pixel of a liquid crystal display according to an exemplary embodiment of the present invention.

As shown in FIG. 4, the overall contour of the one pixel electrode PE has a quadrangle shape. The first pixel electrode PEa and the second pixel electrode PEb engage with each other with a gap 91 therebetween. The first pixel electrode PEa and the second pixel electrode PEb are generally symmetrical with each other around a horizontal transverse center line CL, and are divided into upper and lower regions.

The first pixel electrode PEa includes a lower projection, a left longitudinal stem, is a transverse stem extending to the right from a center of the longitudinal stem, and a plurality of branches. The branches positioned above the transverse center line CL extend obliquely in an upper right direction from the longitudinal stem or the transverse stem. The branches positioned below the transverse center line CL extend obliquely in a lower right direction from the longitudinal stem or the transverse stem. An angle between the branches and the gate line or the transverse center line CL may be approximately 45 degrees. The upper and lower branches may be at right angles to each other around the transverse center line CL.

The second pixel electrode PEb includes a lower projection portion, a right longitudinal stem, upper and lower transverse stems, and a plurality of branches. The upper and lower transverse stems extend horizontally to the left from an upper end and a lower end of the longitudinal stem, respectively. The branches positioned above the transverse center line CL extend obliquely in a lower left direction from the longitudinal stem portion or the upper horizontal stem. The branches positioned below the transverse center line CL extend obliquely in an upper left direction from the longitudinal stem or the lower transverse stem. An angle between the branches of the second pixel electrode PEb and the gate line or the transverse center line CL may also be approximately 45 degrees. The upper and lower branches may be at right angles to each other around the transverse center line CL.

The branches of the first pixel electrode PEa and the second pixel electrode PEb engage with each other with a gap and are alternately disposed, thereby forming a pectinated pattern.

However, the shape of the first pixel electrode PEa and the second pixel electrode PEb of one pixel PX of the liquid crystal panel assembly 300 according to an exemplary embodiment of the present invention is not limited to that described in the exemplary is embodiment above; the pixel electrode PE may include all shapes in which at least portions of the first pixel electrode PEa and the second pixel electrode PEb are formed with the same layer and are alternately arranged.

Figure 5:
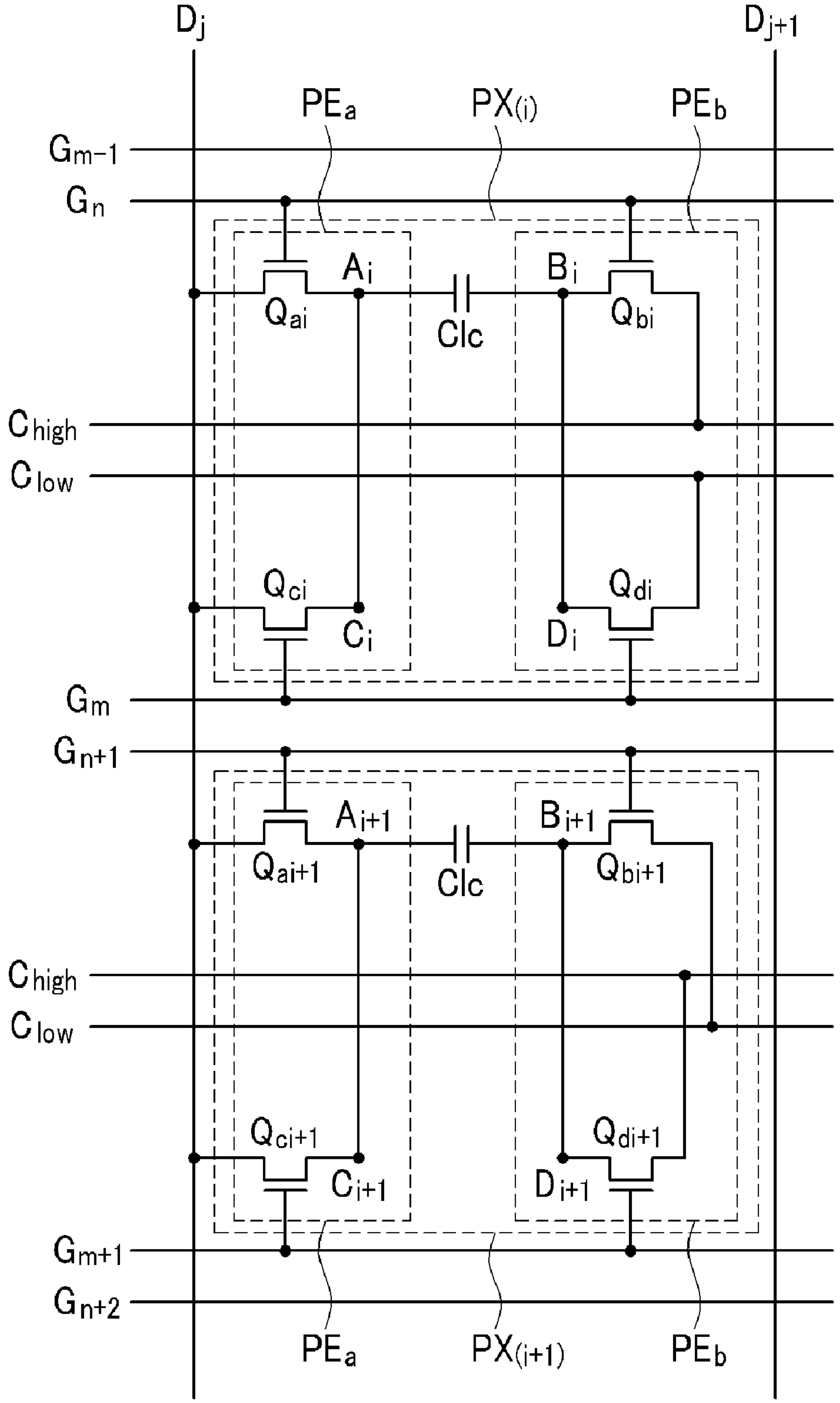
FIG. 5 is an equivalent circuit diagram of two pixels in a liquid crystal display according to an exemplary embodiment of the present invention.
Figure 6:
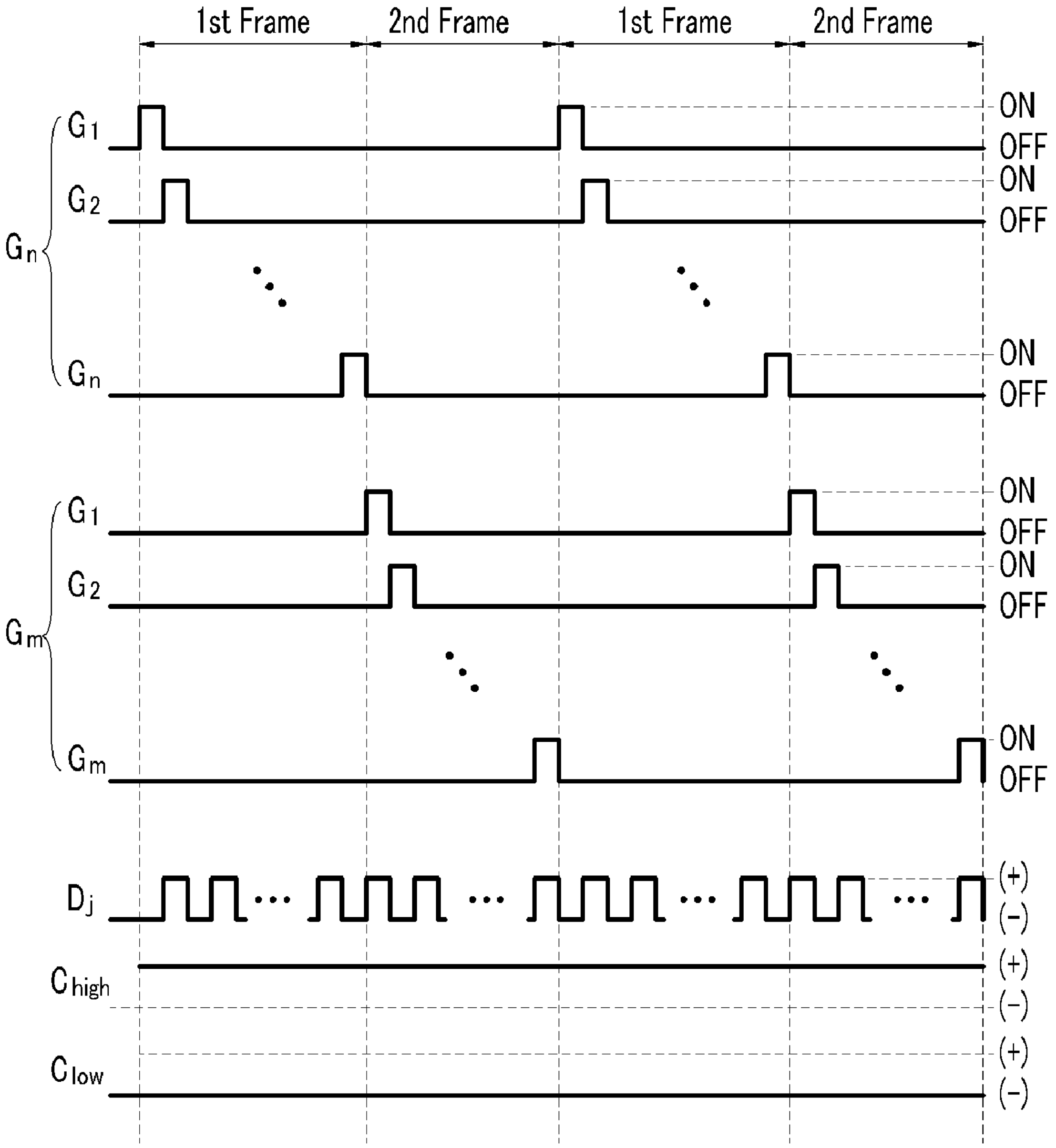
FIG. 6 is a waveform diagram of a signal applied to one pixel of the liquid crystal display shown in FIG. 5.

Next, signal lines and an arrangement thereof, and a driving method of a liquid crystal display according to an exemplary embodiment of the present invention will be described with reference to FIG. 5 and FIG. 6 as well as FIG. 2. FIG. 5 is an equivalent circuit diagram of two pixels in a liquid crystal display according to an exemplary embodiment of the present invention, and FIG. 6 is a waveform diagram of a signal applied to one pixel of the liquid crystal display shown in FIG. 5.

Referring to FIG. 2 and FIG. 5, a liquid crystal display according to the present exemplary embodiment includes a plurality of first pixels PX(i) and a plurality of second pixels PX(i+1) that neighbor each other in a pixel column direction, and a plurality of signal lines Gm−1, Gm, Gm+1, Gn, Gn+1, Gn+2, Dj, Dj+1, Chigh, and Clow connected thereto. The signal lines Gm−1, Gm, Gm+1, Gn, Gn+1, Gn+2, Dj, Dj+1, Chigh, and Clow include a plurality of pairs of gate lines Gm−1 and Gn, Gm and Gn+1, and Gm+1 and Gn+2 transmitting a gate signal (referred to as a "scanning signal"), a plurality of data lines Dj and Dj+1 transmitting a data voltage, and a plurality of pairs of power supplying lines Chigh and Clow transmitting a voltage.

The first pixel PX(i) (i=1, 2, . . . , n) includes the first switching element Qai, the second switching element Qbi, the third switching element Qci, the fourth switching element Qdi, and the liquid crystal capacitor Clc, where the switching elements are connected to the pair of first gate lines Gn and Gm (m and n are arbitrary integers), the first data line Dj and power supplying lines Chigh and Clow. The first switching element Qai, the second switching element Qbi, the third switching element Qci, and the fourth switching element Qdi are three terminal elements, and for example the first switching element Qai includes a control terminal connected to the first gate line Gn of the pair of first gate lines Gn and Gm, an input terminal connected to the data line Dj, and an output terminal connected to the liquid crystal capacitor Clc. The second switching element Qbi includes a control terminal connected to the first gate line Gn, an input terminal connected to the first power supplying line Chigh of the plurality of pairs of power supplying lines Chigh and Clow, and an output terminal connected to the liquid crystal capacitor Clc. The third switching element Qci includes a control terminal connected to the second gate line Gm of the first pair of gate lines Gn and Gm, an input terminal connected to the data line Dj, and an output terminal connected to the liquid crystal capacitor Clc. The fourth switching element Qdi includes a control terminal connected to the second gate line Gm, an input terminal connected to the second power supplying line Clow of the plurality of pairs of the power supplying lines Chigh and Clow, and an output terminal connected to the liquid crystal capacitor Clc.

The second pixel PX(i+1) (i=1, 2, . . . , n) neighboring the first pixel PX(i) (i=1, 2, . . . , n) in the pixel column direction includes the first switching element Qai+1, the second switching element Qbi+1, the third switching element Qci+1, the fourth switching element Qdi+1, and the liquid crystal capacitor Clc, where the switching elements are connected to the second pair of gate lines Gn+1 and Gm+1 (m and n are arbitrary integers), the first data line Dj and the power supplying lines Chigh and Clow. The first switching element Qai+1 includes a control terminal connected to the first gate line Gn+1 of the second pair of gate lines Gn+1 and Gm+1, a input terminal connected to the data line Dj, and an output terminal connected to the liquid crystal capacitor Clc. The second switching element Qbi+1 includes a control terminal connected to the first gate line Gn+1, an input terminal connected to the second power supplying is line Clow of the plurality of pairs of power supplying lines Chigh and Clow, and an output terminal connected to the liquid crystal capacitor Clc. The third switching element Qci+1 includes a control terminal connected to the second gate line Gm+1 of the second pair gate lines Gn+1 and Gm+1, an input terminal connected to the data line Dj, and an output terminal connected to the liquid crystal capacitor Clc. The fourth switching element Qdi+1 includes a control terminal connected to the second gate line Gm+1, an input terminal connected to the first power supplying line Chigh of the plurality of pairs of power supplying lines Chigh and Clow, and an output terminal connected to the liquid crystal capacitor Clc.

Although not shown, the first power supplying lines Chigh of the plurality of pairs of power supplying lines Chigh and Clow are connected to each other and are applied with the same first voltage, and the second power supplying lines Clow of the plurality of pairs of power supplying lines Chigh and Clow are connected to each other and are applied with the same second voltage. The polarities of the first voltage and the second voltage applied to the first power supplying line Chigh and the second power supplying line Clow are different from each other with respect to the reference voltage Vref. For example, when the voltage applied to the reference voltage Vref is 7.5V, the first voltage may be more than about 15V and the second voltage may be less than about 0V, or vice versa.

Also, the first gate lines Gn and Gn+1 and the second gate lines Gm and Gm+1 forming a pair and connected to one pixel, are applied with the gate-on voltage at different frames. For example, during the first frame, the first gate lines Gn and Gn+1 are sequentially applied with the gate-on voltage, and during the second frame, the second gate lines Gm and Gm+1 may be sequentially applied with the gate-on voltage. Also, during the first frame, the second gate lines Gm and Gm+1 may be sequentially applied with the gate-on voltage, and is during the second frame, the first gate lines Gn and Gn+1 may be sequentially applied with the gate-on voltage.

Next, one example of a driving method of a liquid crystal display according to the present exemplary embodiment will be described.

Firstly, a driving method during the first frame will be described in detail. Referring to FIG. 6 along with FIG. 2 and FIG. 5, if the first gate line Gn of the first pair of gate lines Gn and Gm is applied with the gate-on voltage, the data voltage is applied to the first pixel PX(i) through the turned-on first switching element Qai, and the first voltage is applied to the first pixel PX(i) through the turned-on second switching element Qbi. That is, the first pixel electrode PEa of the first pixel PX(i) is applied with the data voltage flowing in the first data line Dj through the first switching element Qai, and the second pixel electrode PEb is applied with the first voltage flowing in the first power supplying line Chigh through the second switching element Qbi. Here, the points Ai and Bi are applied with the data voltage and the first voltage, respectively, and the voltage difference between two points Ai and Bi is the charging voltage of the liquid crystal capacitor Clc of the first pixel PX(i).

The data voltage and the first voltage applied to the first pixel electrode PEa and the second pixel electrode PEb of the first pixel PX(i) are data voltages corresponding to the luminance for display by the pixel PX(i), and may have opposite polarities with respect to the reference voltage Vref.

Next, the first gate line Gn+1 of the second pair of gate lines Gn+1 and Gm+1 is applied with the gate-on voltage, the data voltage flowing in the first data line Dj is applied to the second pixel PX(i+1) through the turned-on first switching element Qai+1 of the second pixel PX(i+1), and the second voltage flowing in the second power supplying line Clow is applied is through the turned-on second switching element Qbi+1. Here, the points Ai+1 and Bi+1 are applied with the data voltage and the second voltage, respectively, and the voltage difference between two points Ai+1 and Bi+1 is the charging voltage of the liquid crystal capacitor Clc of the second pixel PX(i+1). The data voltage and the second voltage applied to the first pixel electrode PEa and the second pixel electrode PEb of the second pixel PX(i+1) are data voltages corresponding to the luminance for display by the second pixel PX(i+1), and may have opposite polarities with respect to the reference voltage Vref.

For example, in the case of the exemplary embodiment of FIG. 6, the polarities of the data voltages applied to the first pixel electrode PEa of the first pixel PX(i) are negative and the polarity of the first voltage applied to the second pixel electrode PEb of the first pixel PX(i) is positive. The polarities of the data voltages applied to the first pixel electrode PEa of the second pixel PX(i+1) are positive and the polarity of the first voltage applied to the second pixel electrode PEb of the second pixel PX(i+1) is negative. With this configuration, the polarities of the pixel voltages charged to the first pixel PX(i) and the second pixel PX(i+1) during the first frame are changed thereby achieving dot inversion.

However, according to another exemplary embodiment of the present invention, the polarity of the first voltage applied to the first power supplying line Chigh may be negative, and the polarity of the second voltage applied to the second power supplying line Clow may be positive. In this case, the polarity of the data voltage applied through the first data line Dj may be opposite to that of the exemplary embodiment shown in FIG. 6.

This step is repeated to the n-th pixel PX(n) connected to the n-th first gate line, and the first frame is completed. If the first frame is completed, the second frame is started such that the second gate line of the pair of gate lines is sequentially applied with the gate-on voltage.

If the second gate line Gm of the first pair of gate lines Gn and Gm is applied with the gate-on voltage, the data voltage is applied to the first pixel PX(i) through the turned-on third switching element Qci, and the second voltage is applied to the first pixel PX(i) through the turned-on fourth switching element Qdi. That is, the first pixel electrode PEa is applied with the data voltage flowing in the first data line Dj through the third switching element Qci, and the second pixel electrode PEb is applied with the second voltage flowing in the second power supplying line Clow through the fourth switching element Qdi. Here, the points Ci and Di are applied with the data voltage and the second voltage, and the voltage difference between two points Ci and Di is the charging voltage of the liquid crystal capacitor Clc of the first pixel PX(i).

Next, the second gate line Gm+1 of the second pair of gate lines Gn+1 and Gm+1 is applied with the gate-on voltage, the data voltage flowing in the first data line Dj is applied to the second pixel PX(i+1) through the turned-on third switching element Qci+1 of the second pixel PX(i+1), and the first voltage flowing in the first power supplying line Chigh is applied through the turned-on fourth switching element Qdi+1. Here, the points Ci+1 and Di+1 are applied with the data voltage and the first voltage, respectively, and the voltage difference between two points Ci+1 and Di+1 is the charging voltage of the liquid crystal capacitor Clc of the second pixel PX(i+1).

During the second frame, the polarities of the data voltages applied to the first pixel electrode PEa of the first pixel PX(i) are positive, and the polarity of the second voltage applied to the second pixel electrode PEb of the first pixel PX(i) is negative. Also, the polarities of the data voltages applied to the first pixel electrode PEa of the second pixel PX(i+1) are negative, and the polarity of the first voltage applied to the second pixel electrode PEb of the second pixel PX(i+1) is positive. With this configuration, the polarities of the pixel voltages is charged to the first pixel PX(i) and the second pixel PX(i+1) during the second frame are changed, thereby achieving dot inversion.

In the exemplary embodiment of FIG. 6, the polarity of the first voltage is positive and the polarity of the second voltage is negative, however the polarities of the first voltage and the second voltage may be opposite to each other.

The above-described first frame and second frame are repeated such that the desired pixel voltages are applied during the desired frame per each pixel.

Conventionally, one pixel is divided into two pixel electrodes PEa and PEb, like the exemplary embodiment of the present invention and the voltages having different polarities are applied through different switching elements, and one pixel is connected to one gate line and two different data lines for charging the voltage of the desired magnitude to the liquid crystal capacitor Clc. That is, the first switching element and the second switching element connected to the first pixel electrode and the second pixel electrode of each are connected to the same gate line but are connected to different data lines such that they receive the data voltages through different data lines.

However, one pixel of the liquid crystal display according to the present exemplary embodiment is connected to two gate lines forming a pair, one data line, and two power supplying lines. Accordingly, the number of data lines may be reduced and thereby the cost of the driver of the liquid crystal display may be reduced. According to the signal lines and the pixel arrangement of the liquid crystal display according to the present exemplary embodiment, compared with the conventional signal lines and pixel arrangement, the gate lines are formed in pairs such that the number of gate lines is increased, however the gate signals are only the gate on/off signals such that the operation of the gate driver is simple compared with the is data driver such that the manufacturing cost is low. Also, two power supplying lines are added, however the power supplying lines are applied with voltages of the same magnitude such that only a simple driver to apply the voltage is added, and accordingly the driving method is simple and the cost thereof is low.

Figure 7:
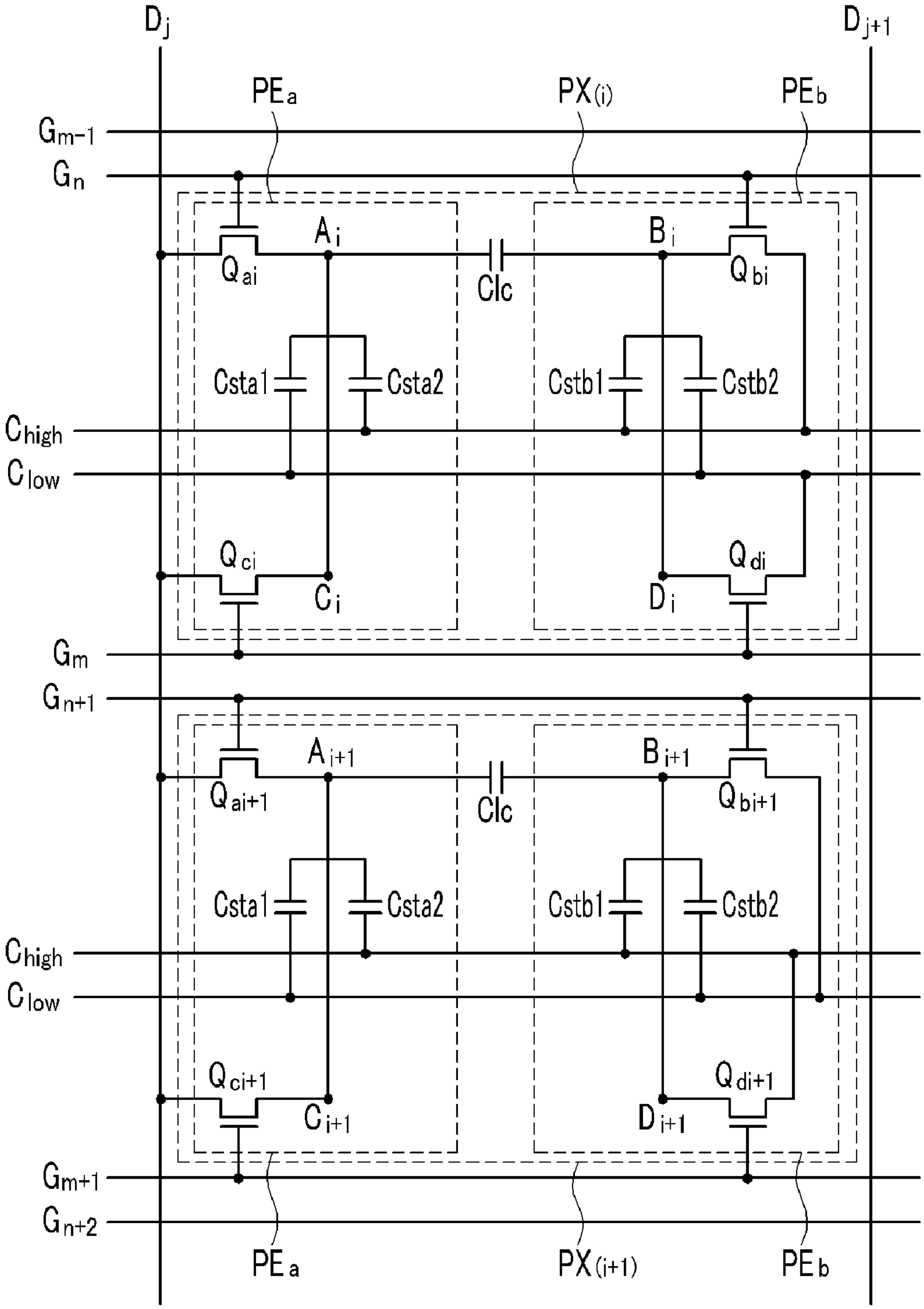
FIG. 7 is an equivalent circuit diagram of two neighboring pixels in a liquid is crystal display according to an exemplary embodiment of the present invention.

Next, the signal line, the pixel arrangement, and the driving method of the liquid crystal display according to another exemplary embodiment of the present invention will be described with reference to FIG. 7. FIG. 7 is an equivalent circuit diagram of two neighboring pixels in a liquid crystal display according to an exemplary embodiment of the present invention.

Signal lines and a pixel arrangement of the liquid crystal display shown in FIG. 7 are similar to the signal lines and the pixel arrangement shown in FIG. 5. Referring to FIG. 7, a liquid crystal display according to the present exemplary embodiment includes a plurality of first pixels PX(i) and a plurality of second pixels PX(i+1) that neighbor each other in a pixel column direction, and a plurality of signal lines Gm−1, Gm, Gm+1, Gn, Gn+1, Gn+2, Dj, Dj+1, Chigh, and Clow connected thereto. The first pixel PX(i) includes the first switching element Qai, the second switching element Qbi, the third switching element Qci, the fourth switching element Qdi, and the liquid crystal capacitor Clc, where the switching elements are connected to the first pair of gate lines Gn and Gm, the data line Dj, and the power supplying lines Chigh and Clow. However, distinct from the liquid crystal display shown in FIG. 5, a liquid crystal display according to the present exemplary embodiment includes a first storage capacitor Csta1 including the first pixel electrode PEa and the second power supplying line Clow, a first storage capacitor Csta2 including the first pixel electrode PEa and the first power supplying line Chigh, a second storage capacitor Cstb1 including the second pixel electrode PEb and the first power supplying line Chigh, and a second storage capacitor Cstb2 including the second pixel electrode PEb and the second power supplying line Clow.

Like the exemplary embodiment shown in FIG. 5, in the case of the liquid crystal display according to the present exemplary embodiment, the first gate lines Gn and Gn+1 and the second gate lines Gm and Gm+1 connected to one pixel and forming a pair are applied with the gate-on voltage at different frames. For example, during the first frame, the first gate lines Gn and Gn+1 may be sequentially applied with the gate-on voltage, and during the second frame the second gate lines Gm and Gm+1 may be sequentially applied with the gate-on voltage.

The first frame will be described. If the first gate line Gn of the first pair of gate lines Gn and Gm is applied with the gate-on voltage, the data voltage flowing in the first data line Dj is applied to the first pixel electrode PEa of the first pixel PX(i) through the turned-on first switching element Qai, and the first voltage flowing in the first power supplying line Chigh is applied to the second pixel electrode PEb through the turned-on second switching element Qbi. Next, the first gate line Gn+1 of the second pair of gate lines Gn+1 and Gm+1 is applied with the gate-on voltage, and the data voltage flowing in the first data line Dj is applied to the second pixel PX(i+1) through the turned-on first switching element Qai+1 of the second pixel PX(i+1), and the second voltage flowing in the second power supplying line Clow is applied through the turned-on second switching element Qbi+1.

Like the exemplary embodiment like FIG. 6, in the case of the liquid crystal display according to the present exemplary embodiment, the polarities of the data voltages applied to the first pixel electrode PEa of the first pixel PX(i) are negative and the polarity of the first voltage applied to the second pixel electrode PEb of the first pixel PX(i) is positive. Also, the polarities of the data voltages applied to the first pixel electrode PEa of the second pixel PX(i+1) are positive and the polarity of the first voltage applied to the second pixel electrode PEb of the second pixel PX(i+1) is negative. With this configuration, the polarities of the pixel voltages charged to the first pixel PX(i) and the second pixel PX(i+1) that are disposed according to the pixel column during the first frame are changed, thereby achieving dot inversion.

The second frame will be described. If the second gate line Gm of the first pair of gate lines Gn and Gm is applied with the gate-on voltage, the data voltage flowing in the first data line Dj is applied to the first pixel electrode PEa of the first pixel PX(i) through the turned-on third switching element Qci, and the second voltage flowing in the second power supplying line Clow is applied to the second pixel electrode PEb through the turned-on fourth switching element Qdi. Next, the second gate line Gm+1 of the second pair of gate lines Gn+1 and Gm+1 is applied with the gate-on voltage, and the data voltage flowing in the first data line Dj is applied to the second pixel PX(i+1) through the turned-on third switching element Qci+1 of the second pixel PX(i+1), and the first voltage flowing in the first power supplying line Chigh is applied through the turned-on fourth switching element Qdi+1.

During the second frame, the polarities of the data voltages applied to the first pixel electrode PEa of the first pixel PX(i) are positive and the polarity of the second voltage applied to the second pixel electrode PEb of the first pixel PX(i) is negative. Also, the polarities of the data voltages applied to the first pixel electrode PEa of the second pixel PX(i+1) are negative and the polarity of the first voltage applied to the second pixel electrode PEb of the second pixel PX(i+1) is positive. With this configuration, the polarities of the pixel voltages charged to the first pixel PX(i) and the second pixel PX(i+1) that are disposed according to the pixel column during the second frame are changed, thereby achieving dot inversion.

As described above, one pixel of the liquid crystal display according to the present exemplary embodiment is connected to two gate lines forming a pair, one data line, and is two power supplying lines. Accordingly, the number of data lines may be reduced, and thereby the cost of the driver of the liquid crystal display may be reduced.

Figure 8:
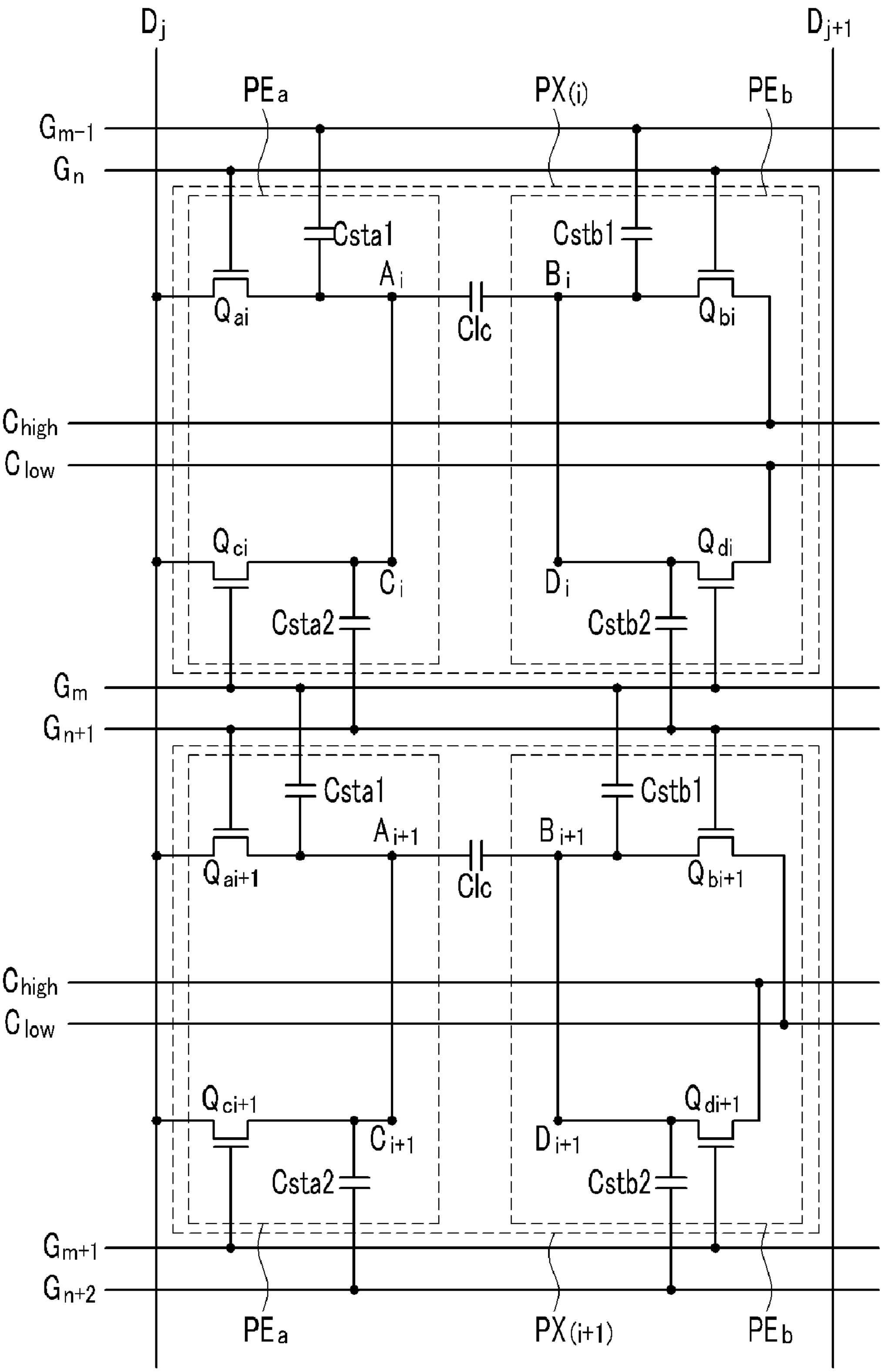
FIG. 8 is an equivalent circuit diagram of two pixels in a liquid crystal display according to an exemplary embodiment of the present invention.

Next, the signal lines and the pixel arrangement of the liquid crystal display according to another exemplary embodiment of the present invention will be described with reference to FIG. 8. FIG. 8 is an equivalent circuit diagram of two neighboring pixels in a liquid crystal display according to an exemplary embodiment of the present invention.

Signal lines and a pixel arrangement of the liquid crystal display shown in FIG. 8 are similar to the signal lines and the pixel arrangement shown in FIG. 5. Referring to FIG. 8, a liquid crystal display according to the present exemplary embodiment includes a plurality of the first pixels PX(i) and a plurality of second pixels PX(i+1) that neighbor each other in a pixel column direction, and a plurality of signal lines Gm−1, Gm, Gm+1, Gn, Gn+1, Gn+2, Dj, Dj+1, Chigh, and Clow connected thereto. The first pixel PX(i) includes the first switching element Qai, the second switching element Qbi, the third switching element Qci, the fourth switching element Qdi, and the liquid crystal capacitor Clc, where the switching elements are connected to the first pair of gate lines Gn and Gm, the data line Dj, and the power supplying lines Chigh and Clow. However, distinct from the liquid crystal display shown in FIG. 5, the first pixel PX(i) includes the first storage capacitor Csta1 including the first pixel electrode PEa and the previous gate line Gm−1, the first storage capacitor Csta2 including the first pixel electrode PEa and the next gate line Gn+1, the second storage capacitor Cstb1 including the second pixel electrode PEb and the previous gate line Gm−1, and the second storage capacitor Cstb2 including the second pixel electrode PEb and the next gate line Gn+1. Also, the second pixel PX(i+1) includes the first storage capacitor Csta1 including the first pixel electrode PEa and the previous gate line Gm, and the first storage capacitor Csta2 including the first pixel electrode PEa and the next is gate line Gn+2, the second storage capacitor Cstb1 including the second pixel electrode PEb and the previous gate line Gm, and the second storage capacitor Cstb2 including the second pixel electrode PEb and the next gate line Gn+2.

The driving method of the liquid crystal display shown in FIG. 8 is similar to the driving method of the liquid crystal display according to the exemplary embodiment shown in FIG. 5 and FIG. 6.

Figure 9:
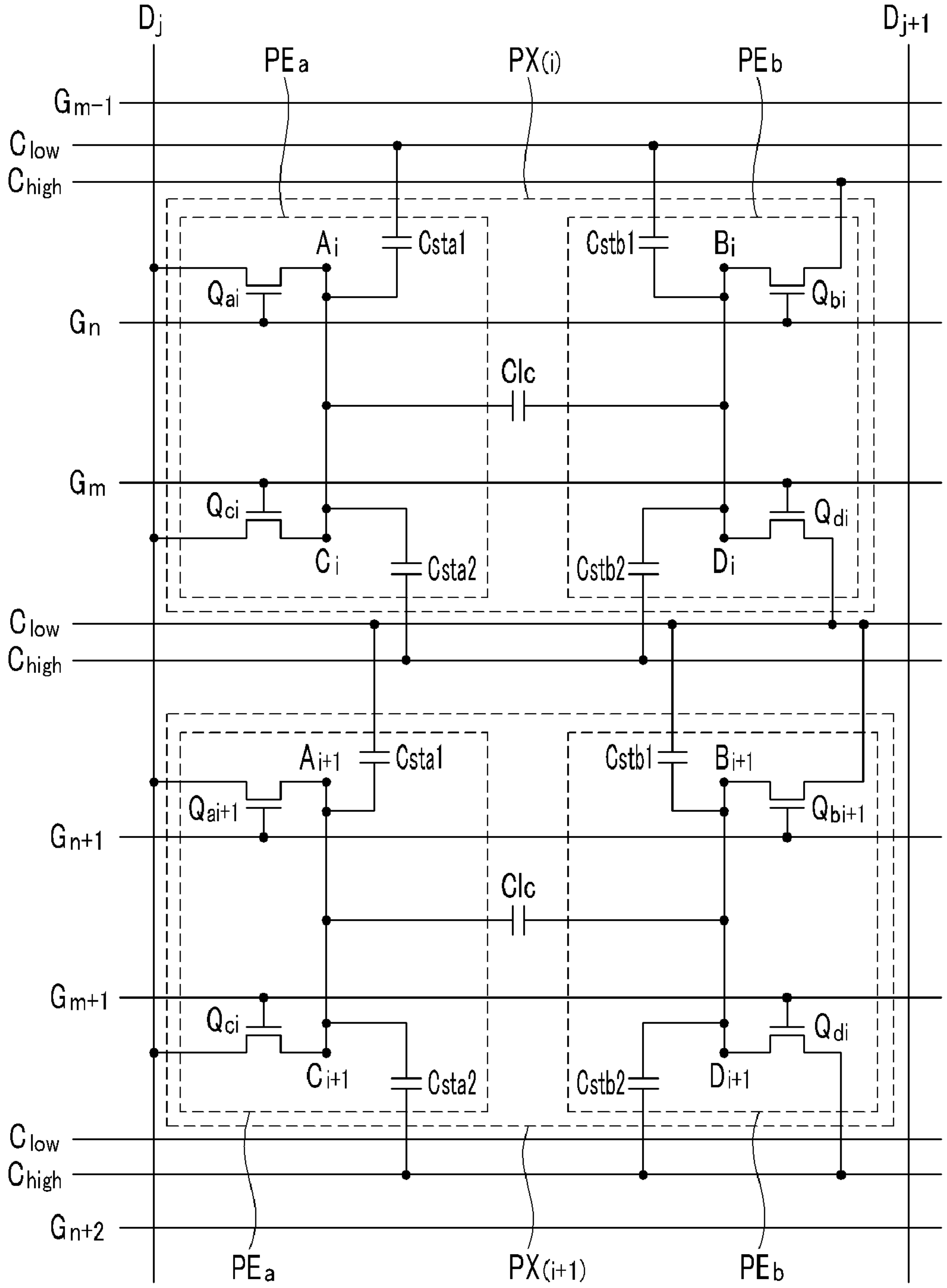
FIG. 9 is an equivalent circuit diagram of two pixels in a liquid crystal display according to an exemplary embodiment of the present invention.

Next, the signal lines and the pixel arrangement of the liquid crystal display according to another exemplary embodiment of the present invention will be described with reference to FIG. 9. FIG. 9 is an equivalent circuit diagram of two neighboring pixels in a liquid crystal display according to an exemplary embodiment of the present invention.

Referring to FIG. 9, a liquid crystal display according to the present exemplary embodiment includes a plurality of the first pixels PX(i) and a plurality of the second pixels PX(i+1) that neighbor each other in a pixel column direction, and a plurality of signal lines Gm−1, Gm, Gm+1, Gn, Gn+1, Gn+2, Dj, Dj+1, Chigh, and Clow connected thereto. The first pixel PX(i) includes the first switching element Qai, the second switching element Qbi, the third switching element Qci, the fourth switching element Qdi, and the liquid crystal capacitor Clc, where the switching elements are connected to the first pair of gate lines Gn and Gm, the data line Dj, and power supplying lines Chigh and Clow. The second pixel PX(i+1) includes the first switching element Qai+1, the second switching element Qbi+1, the third switching element Qci+1, the fourth switching element Qdi+1, and the liquid crystal capacitor Clc, where the switching elements are connected to the second pair of gate lines Gn+1 and Gm+1, the data line Dj, and the power supplying lines Chigh and Clow.

Additionally, the first pixel PX(i) includes the first storage capacitor Csta1 is including the first pixel electrode PEa and the second power supplying line Clow, the first storage capacitor Csta2 including the first pixel electrode PEa and the first power supplying line Chigh, the second storage capacitor Cstb1 including the second pixel electrode PEb and the second power supplying line Clow, and the second storage capacitor Cstb2 including the second pixel electrode PEb and the first power supplying line Chigh. Also, the second pixel PX(i+1) includes the first storage capacitor Csta1 including the first pixel electrode PEa and the second power supplying line Clow, the first storage capacitor Csta2 including the first pixel electrode PEa and the first power supplying line Chigh, the second storage capacitor Cstb1 including the second pixel electrode PEb and the second power supplying line Clow, and the second storage capacitor Cstb2 including second pixel electrode PEb and the first power supplying line Chigh.

In the previous exemplary embodiment, the first power supplying line Chigh and the second power supplying line Clow are disposed between two gate lines forming a pair, however in the case of the liquid crystal display of the present exemplary embodiment, the first power supplying line Chigh and the second power supplying line Clow are disposed between the first gate line Gn and the previous second gate line Gm−1, and the second gate line Gm and the next first gate line Gn+1. In this way, compared with the case in which the first power supplying line Chigh and the second power supplying line Clow are formed between sets of gate lines Gn and Gm, and Gn+1 and Gm+1, of each pixel PX(i) and PX(i+1), the first power supplying line Chigh and the second power supplying line Clow are formed between sets of gate lines Gm−1 and Gn, Gm and Gn+1, and Gm+1 and Gn+2, such that the aperture ratio of the pixel PX(i) and PX(i+1) may be increased.

The driving method of the liquid crystal display according to the present exemplary embodiment is similar to the driving method of the liquid crystal display according to is the exemplary embodiment shown in FIG. 5 and FIG. 6.

Like the exemplary embodiment shown in FIG. 5, in the case of the liquid crystal display according to the present exemplary embodiment, the first gate lines Gn and Gn+1, and the second gate lines Gm and Gm+1 forming a pair and connected to one pixel, are applied with the gate-on voltage at different frames. For example, during the first frame, the first gate lines Gn and Gn+1 may be sequentially applied with the gate-on voltage, during the second frame the second gate lines Gm and Gm+1 may be sequentially applied with the gate-on voltage.

The first frame will be described. If the first gate line Gn of the first pair of gate lines Gn and Gm is applied with the gate-on voltage, the data voltage flowing in the first data line Dj is applied to the first pixel electrode PEa through the turned-on first switching element Qai, and the first voltage flowing in the first power supplying line Chigh is applied to the second pixel electrode PEb through the second switching element Qbi. Next, the first gate line Gn+1 of the second pair of gate lines Gn+1 and Gm+1 is applied with the gate-on voltage, the data voltage flowing in the first data line Dj is applied to the second pixel PX(i+1) through the turned-on first switching element Qai+1 of the second pixel PX(i+1), and the second voltage flowing in the second power supplying line Clow is applied through the turned-on second switching element Qbi+1.

Like the exemplary embodiment shown in FIG. 6, in the case of the liquid crystal display according to the present exemplary embodiment, the polarities of the data voltages applied to the first pixel electrode PEa of the first pixel PX(i) are negative and the polarity of the first voltage applied to the second pixel electrode PEb of the first pixel PX(i) is positive. Also, the polarities of the data voltages applied to the first pixel electrode PEa of the second pixel PX(i+1) are positive and the polarity of the first voltage applied to the second pixel electrode PEb of the second pixel PX(i+1) is negative. With this configuration, the polarities of the pixel voltages charged to the first pixel PX(i) and the second pixel PX(i+1) that are disposed according to the pixel column during the first frame are changed, thereby achieving dot inversion.

The second frame will be described. If the second gate line Gm of the first pair of gate lines Gn and Gm is applied with the gate-on voltage, the data voltage flowing in the first data line Dj is applied to the first pixel electrode PEa of the first pixel PX(i) through the turned-on third switching element Qci, and the second voltage flowing in the second power supplying line Clow is applied to the second pixel electrode PEb through the turned-on fourth switching element Qdi. Next, the second gate line Gm+1 of the second pair of gate lines Gn+1 and Gm+1 is applied with the gate-on voltage, and the data voltage flowing in the first data line Dj is applied to the second pixel PX(i+1) through the turned-on third switching element Qci+1 of the second pixel PX(i+1), and the first voltage flowing in the first power supplying line Chigh is applied through the turned-on fourth switching element Qdi+1.

During the second frame, the polarities of the data voltages applied to the first pixel electrode PEa of the first pixel PX(i) are positive and the polarity of the second voltage applied to the second pixel electrode PEb of the first pixel PX(i) is negative. Also, the polarities of the data voltages applied to the first pixel electrode PEa of the second pixel PX(i+1) are negative and the polarity of the first voltage applied to the second pixel electrode PEb of the second pixel PX(i+1) is positive. With this configuration, the polarities of the pixel voltages charged to the first pixel PX(i) and the second pixel PX(i+1) that are disposed according to the pixel column during the second frame are changed, thereby achieving dot inversion.

As described above, one pixel of the liquid crystal display according to the present exemplary embodiment is connected to two gate lines forming a pair, one data line, and is two power supplying lines. Accordingly, the number of data lines may be reduced, and thereby the cost of the driver of the liquid crystal display may be reduced.

Figure 10:
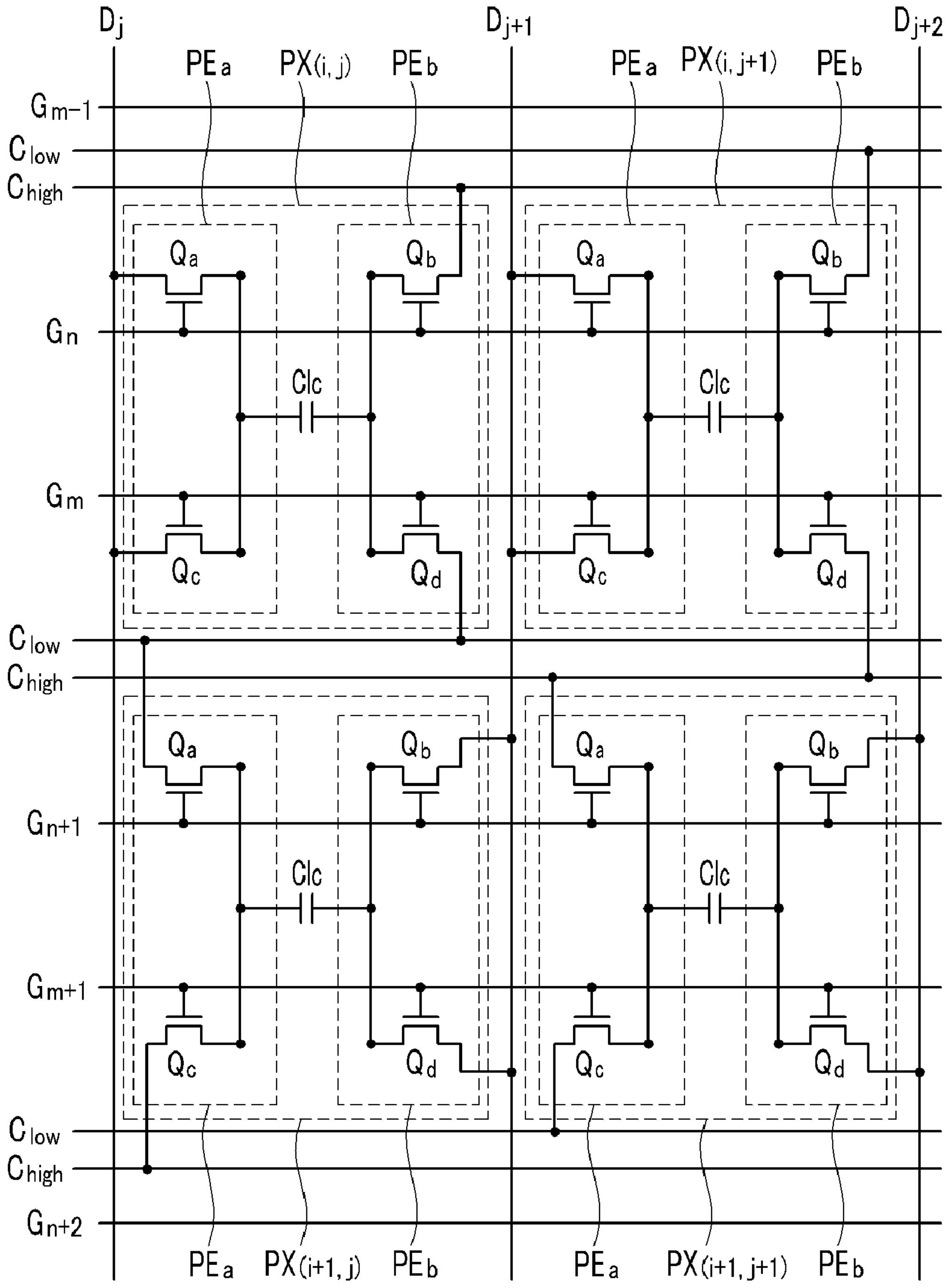
FIG. 10 is an equivalent circuit diagram of four neighboring pixels of a liquid crystal display according to an exemplary embodiment of the present invention.

Next, the signal lines, the pixel arrangement, and the driving method of the liquid crystal display according to another exemplary embodiment of the present invention will be described with reference to FIG. 2 and FIG. 10. FIG. 10 is an equivalent circuit diagram of four neighboring pixels in a liquid crystal display according to an exemplary embodiment of the present invention.

Referring to FIG. 2 and FIG. 10, the liquid crystal display according to the present exemplary embodiment includes a plurality of first pixels PX(i, j) and a plurality of second pixels PX(i, j+1) neighboring in the pixel row direction, and a plurality of third pixels PX(i+1, j) and a plurality of fourth pixels PX(i+1, j+1) neighboring the first pixels PX(i, j) and the second pixels PX(i, j+1) in the pixel column direction, a plurality of pairs of gate lines Gn and Gm, Gn+1 and Gm+1, a plurality of data lines Dj, Dj+1, Dj+2, and a plurality of first power supplying lines Chigh and second power supplying lines Clow connected thereto.

The first switching element Qa and the second switching element Qb respectively connected to the first pixel electrode PEa and the second pixel electrode PEb of the first pixel PX(i, j) include a control terminal connected to the first gate line Gn of the first pair of gate lines Gn and Gm, an input terminal connected, respectively, to the first data line Dj and the first power supplying line Chigh, and an output terminal connected to the liquid crystal capacitor Clc. The third switching element Qc and the fourth switching element Qd respectively connected to the first pixel electrode PEa and the second pixel electrode PEb of the first pixel PX(i, j) include a control terminal connected to the second gate line Gm of the first pair of gate lines Gn and Gm, an input terminal connected, respectively, to the first data line Dj and the second power is supplying line Clow, and an output terminal connected to the liquid crystal capacitor Clc.

The first switching element Qa and the second switching element Qb respectively connected to the first pixel electrode PEa and the second pixel electrode PEb of the second pixel PX(i, j+1) neighboring the first pixel PX(i, j) in the pixel row direction include a control terminal connected to the first gate line Gn of the first pair of gate lines Gn and Gm, an input terminal connected, respectively, to the second data line Dj+1 and the second power supplying line Clow, and an output terminal connected to the liquid crystal capacitor Clc. The third switching element Qc and the fourth switching element Qd respectively connected to the first pixel electrode PEa and the second pixel electrode PEb of the second pixel PX(i, j+1) include a control terminal connected to the second gate line Gm of the first pair of gate lines Gn and Gm, an input terminal connected, respectively, to the second data line Dj+1 and the first power supplying line Chigh, and an output terminal connected to the liquid crystal capacitor Clc.

The first switching element Qa and the second switching element Qb respectively connected to the first pixel electrode PEa and the second pixel electrode PEb of the third pixel PX(i+1, j) neighboring the first pixel PX(i, j) in the pixel column direction include a control terminal connected to the first gate line Gn+1 of the second pair of gate lines Gn+1 and Gm+1, an input terminal connected, respectively, to the second power supplying line Clow and the second data line Dj+1, and an output terminal connected to the liquid crystal capacitor Clc. The third switching element Qc and the fourth switching element Qd respectively connected to the first pixel electrode PEa and the second pixel electrode PEb of the third pixel PX(i+1, j) include a control terminal connected to the second gate line Gm+1 of the second pair of gate lines Gn+1 and Gm+1, an input terminal connected, respectively, to the first power supplying line Chigh and the second data line Dj+1, and an output terminal connected to the liquid crystal capacitor Clc.

The first switching element Qa and the second switching element Qb respectively connected to the first pixel electrode PEa and the second pixel electrode PEb of the fourth pixel PX(i+1, j+1) neighboring the third pixel PX(i+1, j) in the pixel row direction include a control terminal connected to the first gate line Gn+1 of the second pair of gate lines Gn+1 and Gm+1, an input terminal connected, respectively, to the first power supplying line Chigh and the third data line Dj+2, and an output terminal connected to the liquid crystal capacitor Clc. The third switching element Qc and the fourth switching element Qd respectively connected to the first pixel electrode PEa and the second pixel electrode PEb of the fourth pixel PX(i, j) include a control terminal connected to the second gate line Gm+1 of the second pair of gate lines Gn+1 and Gm+1, an input terminal connected, respectively, to the second power supplying line Clow and the third data line Dj+2, and an output terminal connected to the liquid crystal capacitor Clc.

Although not shown, the first power supplying line Chigh of the plurality of pairs of the power supplying lines Chigh and Clow are connected to each other thereby receiving the same first voltage, and the second power supplying line Clow of the plurality of pairs of the power supplying lines Chigh and Clow are connected to each other thereby receiving the same second voltage. The polarities of the first voltage and the second voltage applied to the first power supplying line Chigh and the second power supplying line Clow are different from each other with respect to the reference voltage Vref. For example, when the voltage applied to the reference voltage Vref is 7.5V, the first voltage may be more than about 15V and the second voltage may be less than about 0V, or vice versa.

Also, the first gate lines Gn and Gn+1, and the second gate lines Gm and Gm+1, forming a pair and connected to one pixel, are applied with the gate-on voltage at different frames. For example, during the first frame, the first gate lines Gn and Gn+1 are sequentially is applied with the gate-on voltage, during the second frame as the frame following the first frame, the second gate lines Gm and Gm+1 may be sequentially applied with the gate-on voltage. Also, during the first frame, the second gate lines Gm and Gm+1 may be sequentially applied with the gate-on voltage, and during the second frame, the first gate lines Gn and Gn+1 may be sequentially applied with the gate-on voltage.

Next, one example of a driving method of a liquid crystal display according to the present exemplary embodiment will be described.

Firstly, a driving method during the first frame will be described in detail. Referring to FIG. 10 along with FIG. 2, if the first gate line Gn of the first pair of gate lines Gn and Gm is applied with the gate-on voltage, the first switching element Qa and the second switching element Qb of the first pixel PX(i, j) and the second pixel PX(i, j+1) are turned on. Through the turned-on first switching element Qa and second switching element Qb, the first pixel electrode PEa of the first pixel PX(i, j) is applied with the data voltage flowing in the first data line Dj, and the second pixel electrode PEb is applied with the first voltage flowing in the first power supplying line Chigh. Also, the first pixel electrode PEa of the second pixel PX(i, j+1) is applied with the data voltage flowing in the second data line Dj+1, and the second pixel electrode PEb is applied with the second voltage flowing in the second power supplying line Clow.

Next, if the gate-on voltage is applied to the first gate line Gn+1 of the second pair of gate lines Gn+1 and Gm+1, the first switching element Qa and the second switching element Qb of the third pixel PX(i+1, j) and the fourth pixel PX(i+1, j+1) are turned on. Through the turned-on first switching element Qa and second switching element Qb, the first pixel electrode PEa of the third pixel PX(i+1, j) is applied with the second voltage flowing in the is second power supplying line Clow, and the second pixel electrode PEb is applied with the data voltage flowing in the second data line Dj+1. Also, the first pixel electrode PEa of the fourth pixel PX(i+1, j+1) is applied with the first voltage flowing in the first power supplying line Chigh, and the second pixel electrode PEb is applied with the data voltage flowing in the third data line Dj+2.

In the liquid crystal display according to the present exemplary embodiment, the polarity of the data voltage flowing in the first data line Dj may be periodically changed from the positive, the polarity of the data voltage flowing in the second data line Dj+1 may be periodically changed from the negative, and the polarity of the data voltage flowing in the third data line Dj+2 may be periodically changed from the positive during the first frame. Also, in the exemplary embodiment, the polarity of the first voltage flowing in the first power supplying line Chigh is positive, and the polarity of the second voltage flowing in the second power supplying line Clow is negative. However, the polarity of the voltage flowing in the data line and the power supplying line may be opposite thereto.

Hereinafter, the polarity of a pixel is referred to as positive where the polarity of the voltage applied to the first pixel electrode PEa of the pixel is negative and the polarity of the voltage applied to the second pixel electrode PEb of the pixel is positive, and the polarity of a pixel referred to as negative where the polarity of the voltage applied to the first pixel electrode PEa of the pixel is positive and the polarity of the voltage applied to the second pixel electrode PEb of the pixel is negative. In the liquid crystal display of the present exemplary embodiment, the polarity of the first pixel PX(i, j) is positive, the polarity of the second pixel PX(i, j+1) is negative, the polarity of the third pixel PX(i+1, j) is negative, and the polarity of the fourth pixel PX(i+1, j+1) is positive. That is, the liquid crystal display of the present exemplary embodiment is achieves a dot inversion configuration.

If the first frame is completed, the second frame is started such that the second gate line of the pair of gate lines is sequentially applied with the gate-on voltage.

If the second gate line Gm of the first pair of gate lines Gn and Gm is applied with the gate-on voltage, the third switching element Qc and the fourth switching element Qd of the first pixel PX(i, j) and the second pixel PX(i, j+1) are turned on. Through the turned-on third switching element Qc and fourth switching element Qd, the first pixel electrode PEa of the first pixel PX(i, j) is applied with the data voltage flowing in the first data line Dj, and the second pixel electrode PEb is applied with the second voltage flowing in the second power supplying line Clow. Also, the first pixel electrode PEa of the second pixel PX(i, j+1) is applied with the data voltage flowing in the second data line Dj+1, and the second pixel electrode PEb is applied with the second voltage flowing in the first power supplying line Chigh.

Next, if the second gate line Gm+1 of the second pair of gate lines Gn+1 and Gm+1 is applied with the gate-on voltage, the third switching element Qc and the fourth switching element Qd of the third pixel PX(i+1, j) and the fourth pixel PX(i+1, j+1) are turned on. Through the turned-on third switching element Qc and fourth switching element Qd, the first pixel electrode PEa of the third pixel PX(i+1, j) is applied with the first voltage flowing in the first power supplying line Chigh, and the second pixel electrode PEb is applied with the data voltage flowing in the second data line Dj+1. Also, the first pixel electrode PEa of the fourth pixel PX(i+1, j+1) is applied with the second voltage flowing in the second power supplying line Clow, and the second pixel electrode PEb is applied with the data voltage flowing in the third data line Dj+2.

The above-described first frame and second frame are repeated such that the is desired pixel voltages are applied to each pixel during the desired frame.

Like the previous exemplary embodiments, one pixel of the liquid crystal display according to the present exemplary embodiment is connected to two gate lines forming a pair, one data line, and two power supplying lines. Also, the second pixel PX(i, j+1) and the third pixel PX(i+1, j) that are diagonally disposed share the second data line Dj+1 such that the number of data lines may be reduced and the cost of the driver of the liquid crystal display may be reduced.

Figure 11:
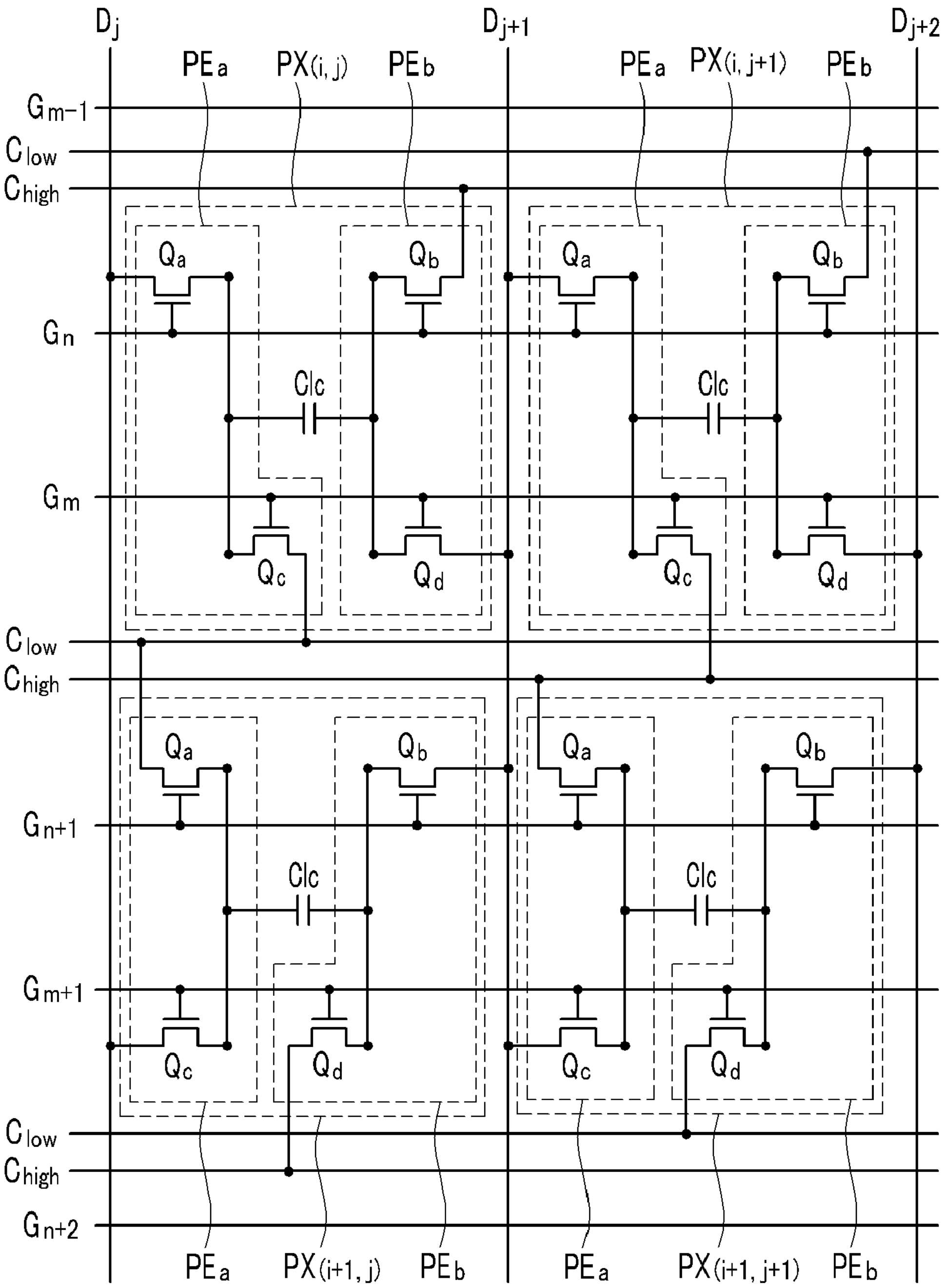
FIG. 11 is an equivalent circuit diagram of four neighboring pixels of a liquid crystal display according to an exemplary embodiment of the present invention.

Next, the signal lines, the pixel arrangement, and the driving method of the liquid crystal display according to another exemplary embodiment of the present invention will be described with reference to FIG. 11 as well as FIG. 2. FIG. 11 is an equivalent circuit diagram of four neighboring pixels in a liquid crystal display according to an exemplary embodiment of the present invention.

Referring to FIG. 2 and FIG. 11, the liquid crystal display according to the present exemplary embodiment includes a plurality of first pixels PX(i, j) and a plurality of second pixels PX(i, j+1) neighboring in the pixel row direction, a plurality of third pixels PX(i+1, j) and a plurality of fourth pixels PX(i+1, j+1) neighboring the first pixels PX(i, j) and the second pixels PX(i, j+1) in the pixel column direction, a plurality of pairs of gate lines Gn and Gm, Gn+1 and Gm+1, a plurality of data lines Dj, Dj+1, Dj+2, and a plurality of first power supplying lines Chigh and second power supplying lines Clow connected thereto.

The first switching element Qa and the second switching element Qb respectively connected to the first pixel electrode PEa and the second pixel electrode PEb of the first pixel PX(i, j) include a control terminal connected to the first gate line Gn of the first pair of gate lines Gn and Gm, an input terminal connected, respectively, to the first data line Dj and the first power is supplying line Chigh, and an output terminal connected to the liquid crystal capacitor Clc. The third switching element Qc and the fourth switching element Qd respectively connected to the first pixel electrode PEa and the second pixel electrode PEb of the first pixel PX(i, j) include a control terminal connected to the second gate line Gm of the first pair of gate lines Gn and Gm, an input terminal connected, respectively, to the second power supplying line Clow and the second data line Dj+1, and an output terminal connected to the liquid crystal capacitor Clc.

The first switching element Qa and the second switching element Qb respectively connected to the first pixel electrode PEa and the second pixel electrode PEb of the second pixel PX(i, j+1) neighboring the first pixel PX(i, j) in the pixel row direction include a control terminal connected to the first gate line Gn of the first pair of gate lines Gn and Gm, an input terminal connected, respectively, to the second data line Dj+1 and the second power supplying line Clow, and an output terminal connected to the liquid crystal capacitor Clc. The third switching element Qc and the fourth switching element Qd respectively connected to the first pixel electrode PEa and the second pixel electrode PEb of the second pixel PX(i, j+1) include a control terminal connected to the second gate line Gm of the first pair of gate lines Gn and Gm, an input terminal connected, respectively, to the first power supplying line Chigh and the third data line Dj+2, and an output terminal connected to the liquid crystal capacitor Clc.

The first switching element Qa and the second switching element Qb respectively connected to the first pixel electrode PEa and the second pixel electrode PEb of the third pixel PX(i+1, j) neighboring the first pixel PX(i, j) in the pixel column direction include a control terminal connected to the first gate line Gn+1 of the second pair of gate lines Gn+1 and Gm+1, an input terminal connected, respectively, to the second power supplying line Clow and the second data line Dj+1, and an output terminal connected to the liquid crystal capacitor Clc. The is third switching element Qc and the fourth switching element Qd respectively connected to the first pixel electrode PEa and the second pixel electrode PEb of the third pixel PX(i+1, j) include a control terminal connected to the second gate line Gm+1 of the second pair of gate lines Gn+1 and Gm+1, an input terminal connected, respectively, to the first data line Dj and the first power supplying line Chigh, and an output terminal connected to the liquid crystal capacitor Clc.

The first switching element Qa and the second switching element Qb respectively connected to the first pixel electrode PEa and the second pixel electrode PEb of the fourth pixel PX(i+1, j+1) neighboring the third pixel PX(i+1, j) in the pixel row direction include a control terminal connected to the first gate line Gn+1 of the second pair of gate lines Gn+1 and Gm+1, an input terminal connected, respectively, to the first power supplying line Chigh and the third data line Dj+2, and an output terminal connected to the liquid crystal capacitor Clc. The third switching element Qc and the fourth switching element Qd respectively connected to the first pixel electrode PEa and the second pixel electrode PEb of the fourth pixel PX(i+1, j+1) include a control terminal connected to the second gate line Gm+1 of the second pair of gate lines Gn+1 and Gm+1, an input terminal connected, respectively, to the second data line Dj+1 and the second power supplying line Clow, and an output terminal connected to the liquid crystal capacitor Clc.

Although not shown, the first power supplying line Chigh of the plurality of pairs of power supplying lines Chigh and Clow are connected to each other thereby receiving the same first voltage, and the second power supplying line Clow of the plurality of pairs of the power supplying lines Chigh and Clow are connected to each other thereby receiving the same second voltage. The polarities of the first voltage and the second voltage applied to the first power supplying line Chigh and the second power supplying line Clow are different from each other with respect to the reference voltage Vref. For example, when the voltage applied to the reference voltage Vref is 7.5V, the first voltage may be more than about 15V and the second voltage may be less than about 0V, or vice versa.

Also, the first gate lines Gn and Gn+1, and the second gate lines Gm and Gm+1, forming a pair and connected to one pixel are applied with the gate-on voltage at the different frame. For example, during the first frame, the first gate lines Gn and Gn+1 are sequentially applied with the gate-on voltage, during the second frame as the frame following the first frame, the second gate lines Gm and Gm+1 may be sequentially applied with the gate-on voltage. Also, during the first frame, the second gate lines Gm and Gm+1 may be sequentially applied with the gate-on voltage, and during the second frame, the first gate lines Gn and Gn+1 may be sequentially applied with the gate-on voltage.

Next, one example of a driving method of a liquid crystal display according to the present exemplary embodiment will be described.

Firstly, a driving method during the first frame will be described in detail. Referring to FIG. 11 along with FIG. 2, if the first gate line Gn of the first pair of gate lines Gn and Gm is applied with the gate-on voltage, the first switching element Qa and the second switching element Qb of the first pixel PX(i, j) and the second pixel PX(i, j+1) are turned on. Through the turned-on first switching element Qa and second switching element Qb, the first pixel electrode PEa of the first pixel PX(i, j) is applied with the data voltage flowing in the first data line Dj, and the second pixel electrode PEb is applied with the first voltage flowing in the first power supplying line Chigh. Also, the first pixel electrode PEa of the second pixel PX(i, j+1) is applied with the data voltage flowing in the second data line Dj+1, and the second pixel electrode PEb is applied with the second voltage flowing in the second power supplying line Clow.

Next, if the gate-on voltage is applied to the first gate line Gn+1 of the second pair of gate lines Gn+1 and Gm+1, the first switching element Qa and the second switching element Qb of the third pixel PX(i+1, j) and the fourth pixel PX(i+1, j+1) are turned on. Through the turned-on first switching element Qa and the second switching element Qb, the first pixel electrode PEa of the third pixel PX(i+1, j) is applied with the second voltage flowing in the second power supplying line Clow, and the second pixel electrode PEb is applied with the data voltage flowing in the second data line Dj+1. Also, the first pixel electrode PEa of the fourth pixel PX(i+1, j+1) is applied with the first voltage flowing in the first power supplying line Chigh, and the second pixel electrode PEb is applied with the data voltage flowing in the third data line Dj+2.

In the liquid crystal display according to the present exemplary embodiment, the polarity of the data voltage flowing in the first data line Dj may be positive, the polarity of the data voltage flowing in the second data line Dj+1 may be negative, and the polarity of the data voltage flowing in the third data line Dj+2 may be positive during the first frame. Also, in the exemplary embodiment, the polarity of the first voltage flowing in the first power supplying line Chigh is positive, and the polarity of the second voltage flowing in the second power supplying line Clow is negative. However, the polarity of the voltage flowing in the data line and the power supplying line may be opposite thereto.

In the liquid crystal display of the present exemplary embodiment, the polarity of the first pixel PX(i, j) is positive, the polarity of the second pixel PX(i, j+1) is negative, the polarity of the third pixel PX(i+1, j) is negative, and the polarity of the fourth pixel PX(i+1, j+1) is positive. That is, in the case of the liquid crystal display according to the present exemplary embodiment, the data voltage is configured to achieve column inversion, however the pixels of the liquid crystal display achieve dot inversion.

If the first frame is completed, the second frame is started such that the second gate line of the pair of gate lines is sequentially applied with the gate-on voltage.

If the second gate line Gm of the first pair of gate lines Gn and Gm is applied with the gate-on voltage, the third switching element Qc and the fourth switching element Qd of the first pixel PX(i, j) and the second pixel PX(i, j+1) are turned on. Through the turned-on third switching element Qc and fourth switching element Qd, the first pixel electrode PEa of the first pixel PX(i, j) is applied with the second voltage flowing in the second power supplying line Clow, and the second pixel electrode PEb is applied with the data voltage flowing in the second data line Dj+1. Also, the first pixel electrode PEa of the second pixel PX(i, j+1) is applied with the second voltage flowing in the first power supplying line Chigh, and the second pixel electrode PEb is applied with the data voltage flowing in the third data line Dj+2.

Next, if the second gate line Gm+1 of the second pair of gate lines Gn+1 and Gm+1 is applied with the gate-on voltage, the third switching element Qc and the fourth switching element Qd of the third pixel PX(i+1, j) and the fourth pixel PX(i+1, j+1) are turned on. Through the turned-on third switching element Qc and fourth switching element Qd, the first pixel electrode PEa of the third pixel PX(i+1, j) is applied with the data voltage flowing in the first data line Dj, and the second pixel electrode PEb is applied with the first voltage flowing in the first power supplying line Chigh. Also, the first pixel electrode PEa of the fourth pixel PX(i+1, j+1) is applied with the data voltage flowing in the second data line Dj+1, and the second pixel electrode PEb is applied with the second voltage flowing in the second power supplying line Clow.

The above-described first frame and second frame are repeated such that the desired pixel voltages are applied to each pixel during the desired frame.

One pixel of the liquid crystal display according to the present exemplary embodiment is connected to two gate lines, two data lines, and two power supplying lines, however the fourth switching element Qd and the first switching element Qa of the first pixel PX(i, j) and the second pixel PX(i, j+1) neighboring in the pixel row direction share the second data line Dj+1, and the second switching element Qb and the third switching element Qc of the third pixel PX(i+1, j) and the fourth pixel PX(i+1, j+1) share the second data line Dj+1 such that the number of data lines is reduced such that the cost of the driver of the liquid crystal display may be reduced.

Figure 12:
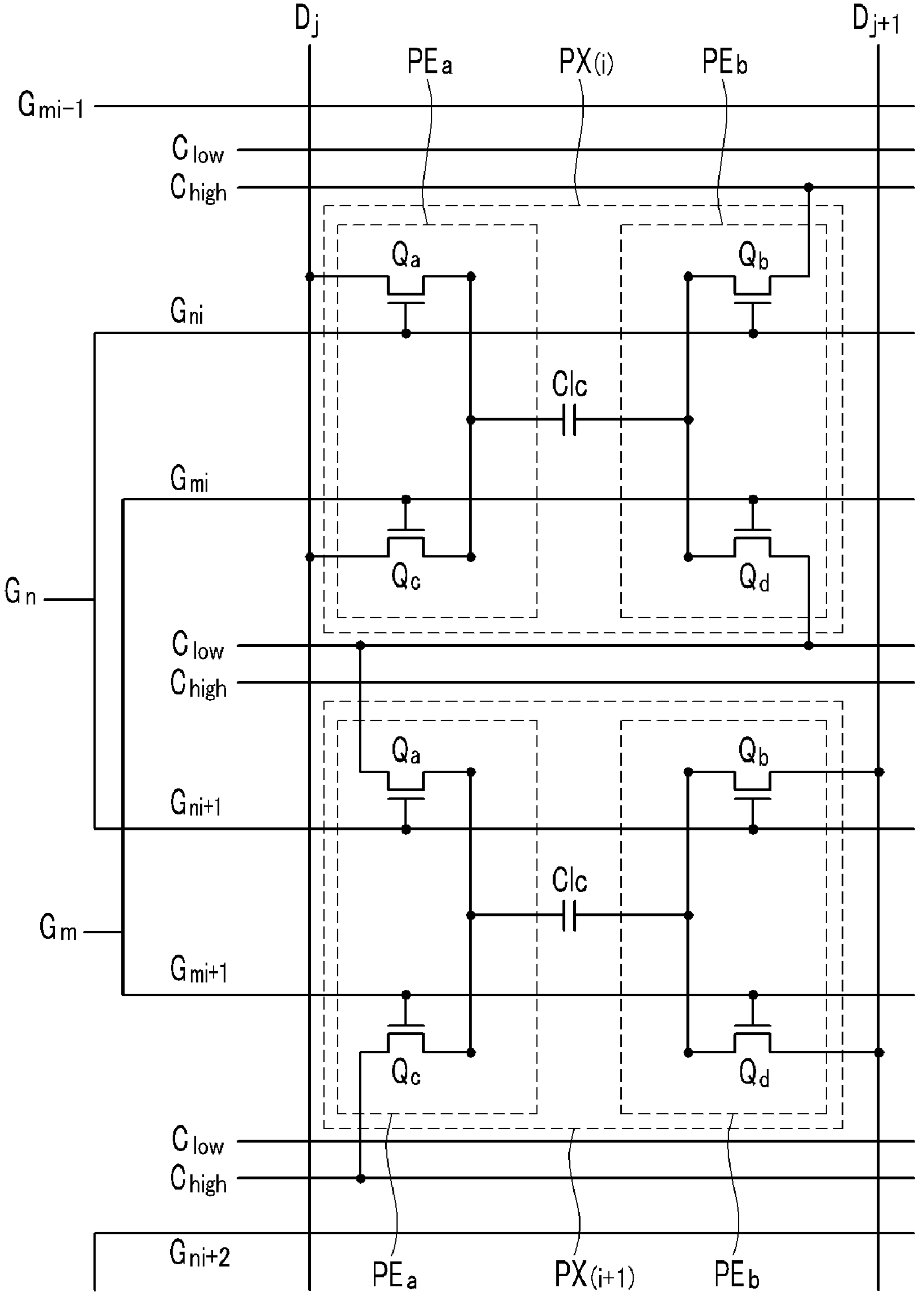
FIG. 12 is an equivalent circuit diagram of two pixels in a liquid crystal display according to an exemplary embodiment of the present invention.

Next, the signal line, the pixel arrangement, and the driving method of the liquid crystal display according to another exemplary embodiment of the present invention will be described with reference to FIG. 12 as well as FIG. 2. FIG. 12 is an equivalent circuit diagram of two neighboring pixels in a liquid crystal display according to an exemplary embodiment of the present invention.

Referring to FIG. 12, the liquid crystal display according to the present exemplary embodiment includes a plurality of the first pixels PX(i) and a plurality of second pixels PX(i+1) that neighbor each other in the pixel column direction, and a plurality of signal lines Gm, Gn, Dj, Dj+1, Chigh, and Clow connected thereto. The first gate lines Gn are divided into the first branches Gni and the second branches Gni+1 disposed up and down, respectively, in the pixel column direction, and the second gate lines Gm are divided into the first branches Gmi and the second branches Gmi+1 disposed up and down, respectively, in the pixel column direction. The first branches Gni of the first gate lines Gn and the first branches Gmi of the second gate lines is Gm are connected to the first pixel PX(i), and the second branches Gni+1 of the first gate lines Gn and the second branches Gmi+1 of the second gate lines Gm are connected to the second pixel PX(i+1).

The first power supplying line Chigh and the second power supplying line Clow are disposed between the first branch Gni of the first gate line Gn and the previous second branch Gmi−1 of the previous second gate line, between the first branch Gmi of the second gate line Gm and the second branch Gni+1 of the first gate line Gn, and between the second branch Gmi+1 of the second gate line Gm and the first branch Gni+2 of the next first gate line.

The first switching element Qa and the second switching element Qb respectively connected to the first pixel electrode PEa and the second pixel electrode PEb of the first pixel PX(i) include a control terminal connected to the first branch Gni of the first gate line Gn, an input terminal connected, respectively, to the first data line Dj and the first power supplying line Chigh, and an output terminal connected to the liquid crystal capacitor Clc. The third switching element Qc and the fourth switching element Qd respectively connected to the first pixel electrode PEa and the second pixel electrode PEb of the first pixel PX(i) include a control terminal connected to the first branch Gmi of the second gate line Gm, an input terminal connected to the first data line Dj and the second power supplying line Clow, and an output terminal connected to the liquid crystal capacitor Clc.

The first switching element Qa and the second switching element Qb respectively connected to the first pixel electrode PEa and the second pixel electrode PEb of the second pixel PX(i+1) neighboring the first pixel PX(i) in the pixel column direction include a control terminal connected to the second branch Gni+1 of the first gate line Gn, an input terminal connected, respectively, to the second power supplying line Clow and the second data line Dj+1, and an is output terminal connected to the liquid crystal capacitor Clc. The third switching element Qc and the fourth switching element Qd respectively connected to the first pixel electrode PEa and the second pixel electrode PEb of the second pixel PX(i+1) include a control terminal connected to the second branch Gmi+1 of the second gate line Gm, an input terminal connected, respectively, to the first power supplying line Chigh and the second data line Dj+1, and an output terminal connected to the liquid crystal capacitor Clc.

The driving method of the liquid crystal display according to the exemplary embodiment is similar to the driving method of the liquid crystal display according to the exemplary embodiment shown in FIG. 5 and FIG. 6.

Like the exemplary embodiment shown in FIG. 5, in the case of the liquid crystal display according to the present exemplary embodiment, the first branches and the second branches of the first gate lines (e.g., Gni, Gni+1, Gni+2) and the first branches and the second branches of the second gate lines (e.g., Gmi, Gmi+1, Gmi+2) that form a pair and connected to one pixel, are applied with the gate-on voltage at different frames. For example, during the first frame, the first gate lines Gn and Gn+1 may be sequentially applied with the gate-on voltage, and during the second frame as the frame following the first frame, the second gate lines Gm and Gm+1 may be sequentially applied with the gate-on voltage.

Referring to the first frame, if the first gate line Gn is applied with the gate-on voltage, the first switching element Qa and the second switching element Qb of the first pixel PX(i) and the second pixel PX(i+1) are turned on. Accordingly, in the first pixel PX(i), the first pixel electrode PEa is applied with the data voltage flowing in the first data line Dj through the first switching element Qa, and the second pixel electrode PEb is applied with the first voltage flowing in the first power supplying line Chigh through the second switching element Qb, and in is the second pixel PX(i+1), the first pixel electrode PEa is applied with the second voltage flowing in the second power supplying line Clow through the first switching element Qa, and the second pixel electrode PEb of the second pixel PX(i+1) is applied with the data voltage flowing in the second data line Dj+1 through the second switching element Qb. This step is sequentially repeated according to all first gate lines Gn, thereby completing the first frame.

Next, the second frame will be described. If the second gate line Gm is applied with the gate-on voltage, the third switching element Qc and the fourth switching element Qd of the first pixel PX(i) and the second pixel PX(i+1) are turned on. Accordingly, in the first pixel PX(i), the first pixel electrode PEa is applied with the data voltage flowing in the first data line Dj through the third switching element Qc, and the second pixel electrode PEb is applied with the second voltage flowing in the second power supplying line Clow through the fourth switching element Qd, and in the second pixel PX(i+1), the first pixel electrode PEa is applied with the first voltage flowing in the first power supplying line Chigh through the third switching element Qc, and second pixel electrode PEb is applied with the data voltage flowing in the second data line Dj+1 through the fourth switching element Qd. This step is sequentially repeated according to all second gate lines Gm, thereby completing the second frame.

In the liquid crystal display according to the present exemplary embodiment, the first pixel PX(i) and the second pixel PX(i+1) neighboring each other in the pixel column direction are connected to the branches Gni, Gni+1, Gmi, and Gmi+1 of the same gate lines Gn and Gm such that the gate on/off voltages are applied through one of gate lines Gn and Gm at each frame. Accordingly, the liquid crystal display may operate at a high driving speed.

Also, compared with the case where the first power supplying line Chigh and the second power supplying line Clow are disposed between two gate lines connected to the pixels PX(i) and PX(i+1), when the first power supplying line Chigh and the second power supplying line Clow are disposed between two gate lines between pixels, the aperture ratio of the pixels PX(i) and PX(i+1) may be improved.

As described above, one pixel of the liquid crystal display according to the present exemplary embodiment is connected to two gate lines forming the pair, one data line, and two power supplying lines. Accordingly, the number of data lines may be reduced, and thereby the cost of the driver of the liquid crystal display may be reduced.

As described above, the signal lines, the pixel arrangement, and the driving methods of the liquid crystal display according to the exemplary embodiment may be applied to all shapes of pixel including the first pixel electrode and the second pixel electrode of which at least portions are formed with the same layer and are alternately arranged.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display comprising:
a first substrate;
a second substrate facing the first substrate;
a liquid crystal layer interposed between the first substrate and the second substrate, the liquid crystal layer comprising liquid crystal molecules;
a first gate line disposed on the first substrate, the first gate line being configured to transmit a first gate signal;
a second gate line disposed on the first substrate, the second gate line being configured to transmit a second gate signal;
a first data line disposed on the first substrate, the first data line being configured to transmit a first data signal;
a first power supplying line disposed on the first substrate;
a second power supplying line disposed on the first substrate;
a first switching element connected to the first gate line and the first data line;
a second switching element connected to the first gate line and the first power supplying line;
a third switching element connected to the second gate line and the first data line;
a fourth switching element connected to the second gate line and the second power supplying line;
a first pixel electrode connected to the first switching element and the third switching element; and
a second pixel electrode connected to the second switching element and the fourth switching element, the second pixel electrode being separated from the first pixel electrode,
wherein the at least one first power supplying line is applied with a first voltage and the at least one second power supplying line is applied with a second voltage.

2. The liquid crystal display of claim 1, wherein
a polarity of the first voltage is different than a polarity of the second voltage.

3. The liquid crystal display of claim 1, wherein
the first gate line and the second gate line are applied with a gate-on signal at different frames.

4. The liquid crystal display of claim 3, wherein
the first pixel electrode comprises a plurality of first branches,
the second pixel electrode comprises a plurality of second branches, and
the first branches are alternately arranged with the second branches.

5. The liquid crystal display of claim 4, wherein
in response to application of the gate-on signal to the first gate line, the first pixel electrode is applied with a first data voltage through the first data line and the second pixel electrode is applied with the first voltage through the first power supplying line, and
the polarities of the first data voltage and the first voltage are different from each other.

6. The liquid crystal display of claim 5, wherein
in response to application of the gate-on signal to the second gate line, the first pixel electrode is applied with a second data voltage through the first data line and the second pixel electrode is applied with the second voltage through the second power supplying line, and
the polarities of the second data voltage and the second voltage are different from each other.

7. The liquid crystal display of claim 6, wherein
the polarities of the first data voltage and the second data voltage are different from each other, and
the polarities of the first voltage and the second voltage are different from each other.

8. The liquid crystal display of claim 1, wherein
the first power supplying line and the second power supplying line are disposed between the first gate line and the second gate line.

9. The liquid crystal display of claim 1, further comprising
a third gate line disposed on the first substrate neighboring the first gate line, the third gate line being configured to transmit the gate signal;
a fourth gate line disposed on the first substrate neighboring the second gate line, the fourth gate line being configured to transmit the gate signal,
wherein the first power supplying line and the second power supplying line are disposed between the first gate line and the third gate line, and between the second gate line and the fourth gate line.

10. The liquid crystal display of claim 1, further comprising:
a third gate line disposed on the first substrate, the third gate line being configured to transmit a third gate signal;
a fourth gate line disposed on the first substrate, the fourth gate line being configured to transmit a fourth gate signal;
a second data line disposed on the first substrate, the second data line being configured to transmit a second data signal;
a third power supplying line disposed on the first substrate;
a fourth power supplying line disposed on the first substrate;
a fifth switching element connected to the third gate line and the third power supplying line;
a sixth switching element connected to the third gate line and the second data line;
a seventh switching element connected to the fourth gate line and the fourth power supplying line;
an eighth switching element connected to the fourth gate line and the second data line;
a third pixel electrode connected to the fifth switching element and the seventh switching element; and
a fourth pixel electrode connected to the sixth switching element and the eighth switching element, the fourth pixel electrode being separated from the third pixel electrode,
wherein the pair of the first pixel electrode and the second pixel electrode and the pair of the third pixel electrode and the fourth pixel electrode are disposed between the first data line and the second data line.

11. The liquid crystal display of claim 10, further comprising:
a fifth power supplying line disposed on the first substrate;
a sixth power supplying line disposed on the first substrate;
a ninth switching element connected to the first gate line and the second data line;
a tenth switching element connected to the first gate line and the fifth power supplying line;
an eleventh switching element connected to the second gate line and the second data line;
a twelfth switching element connected to the second gate line and the sixth power supplying line;
a fifth pixel electrode connected to the ninth switching element and the eleventh switching element; and a sixth pixel electrode connected to the tenth switching element and the twelfth switching element, the sixth pixel electrode being separated from the fifth pixel electrode.

12. The liquid crystal display of claim 11, wherein the first gate line and the third gate line are sequentially applied with the gate-on signal at a first frame, and the second gate line and the fourth gate line are sequentially applied with the gate-on signal at a second frame.

13. The liquid crystal display of claim 12, wherein the first pixel electrode comprises a plurality of first branches, the second pixel electrode comprises a plurality of second branches, the first branches are alternately arranged with the second branches, the third pixel electrode comprises a plurality of third branches, the fourth pixel electrode comprises a plurality of fourth branches, and the third branches are alternately arranged with the fourth branches.

14. The liquid crystal display of claim 10, wherein the first gate line and the third gate line are connected to each other, and the second gate line and the fourth gate line are connected to each other.

15. A liquid crystal display comprising:

a first substrate;

a second substrate facing the first substrate;

a liquid crystal layer interposed between the first substrate and the second substrate, the liquid crystal layer comprising liquid crystal molecules;

a first gate line disposed on the first substrate, the first gate line being configured to transmit a first gate signal;

a second gate line disposed on the first substrate, the second gate line being configured to transmit a second gate signal;

a first data line disposed on the first substrate;

a second data line disposed on the first substrate;

a first power supplying line disposed on the first substrate;

a second power supplying line disposed on the first substrate;

a first switching element connected to the first gate line and the first data line;

a second switching element connected to the first gate line and the first power supplying line;

a third switching element connected to the second gate line and the second power supplying line;

a fourth switching element connected to the second gate line and the second data line;

a first pixel electrode connected to the first switching element and the third switching element; and a second pixel electrode connected to the second switching element and the fourth switching element, the second pixel electrode being separated from the first pixel electrode, wherein the at least one first power supplying line is applied with a first voltage and the at least one second power supplying line is applied with a second voltage.

16. The liquid crystal display of claim 15, further comprising:

a third data line disposed on the first substrate;

a third power supplying line disposed on the first substrate;

a fourth power supplying line disposed on the first substrate;

a fifth switching element connected to the first gate line and the second data line;

a sixth switching element connected to the first gate line and the third power supplying line;

a seventh switching element connected to the second gate line and the fourth power supplying line;

an eighth switching element connected to the second gate line and the third data line;

a third pixel electrode connected to the fifth switching element and the seventh switching element; and a fourth pixel electrode connected to the sixth switching element and the eighth switching element, the fourth pixel electrode being separated from the third pixel electrode.

17. The liquid crystal display of claim 16, further comprising:

a third gate line disposed on the first substrate, the first gate line being configured to transmit a third gate signal;

a fourth gate line disposed on the first substrate, the fourth gate line being configured to transmit a fourth gate signal;

a fifth power supplying line disposed on the first substrate;

a sixth power supplying line disposed on the first substrate;

a ninth switching element connected to the third gate line and the fifth power supplying line;

a tenth switching element connected to the third gate line and the second data line;

an eleventh switching element connected to the fourth gate line and the first data line;

a twelfth switching element connected to the fourth gate line and the sixth power supplying line;

a fifth pixel electrode connected to the ninth switching element and the eleventh switching element; and a sixth pixel electrode connected to the tenth switching element and the twelfth switching element, the sixth pixel electrode being separated from the fifth pixel electrode.

18. The liquid crystal display of claim 17, wherein the first gate line and the third gate line are sequentially applied with the gate-on signal at a first frame, and the second gate line and the fourth gate line are sequentially applied with the gate-on signal at a second frame.

19. The liquid crystal display of claim 18, wherein the first pixel electrode comprises a plurality of first branches, the second pixel electrode comprises a plurality of second branches, the first branches are alternately arranged with the second branches, the third pixel electrode comprises a plurality of third branches, the fourth pixel electrode comprises a plurality fourth of branches, and the third branches are alternately arranged with the fourth branches.

* * * * *